(12) United States Patent
Elford

(10) Patent No.: US 12,505,261 B2
(45) Date of Patent: Dec. 23, 2025

(54) SYSTEM AND METHOD FOR GENERATING AN INFILL GEOMETRY OF A BODY

(71) Applicant: The Boeing Company, Chicago, IL (US)

(72) Inventor: Michael C. Elford, Springfield (AU)

(73) Assignee: The Boeing Company, Arlington, VA (US)

( * ) Notice: Subject to any disclaimer, the term of this patent is extended or adjusted under 35 U.S.C. 154(b) by 100 days.

(21) Appl. No.: 17/933,054

(22) Filed: Sep. 16, 2022

(65) Prior Publication Data

US 2024/0095412 A1    Mar. 21, 2024

(51) Int. Cl.
| | | |
|---|---|---|
| *G06F 30/10* | (2020.01) | |
| *B33Y 10/00* | (2015.01) | |
| *B33Y 50/02* | (2015.01) | |
| *G06F 30/23* | (2020.01) | |

(52) U.S. Cl.
CPC ............ *G06F 30/10* (2020.01); *B33Y 10/00* (2014.12); *B33Y 50/02* (2014.12); *G06F 30/23* (2020.01)

(58) Field of Classification Search
CPC ........ G06F 30/23; G06F 30/25; G06F 30/367; G06F 30/398; G06F 30/10; G06F 30/00; G06F 2113/10; G06F 30/17; G06F 30/12; G06F 30/20; G06F 30/13; G06F 2113/26; G06F 2113/28; B33Y 50/02; B33Y 80/00; B32B 3/02; B32B 3/263

See application file for complete search history.

(56) References Cited

U.S. PATENT DOCUMENTS

| | | |
|---|---|---|
| 4,757,665 A | 7/1988 | Hardigg |
| 6,207,256 B1 | 3/2001 | Tashiro |
| 2004/0074206 A1 | 4/2004 | Tanase |
| 2013/0000247 A1 | 1/2013 | Sypeck |

(Continued)

FOREIGN PATENT DOCUMENTS

EP    3034208    6/2016

OTHER PUBLICATIONS

Provaggi, Elena, et al. "3D printing assisted finite element analysis for optimising the manufacturing parameters of a lumbar fusion cage." Materials & Design 163 (2019): 107540. (Year: 2019).*

(Continued)

*Primary Examiner* — Michael Edward Cocchi

(57) ABSTRACT

A method of generating an infill geometry of a body, comprises providing a driver mesh comprised of tetrahedral elements, and providing a reference unit cell mesh configured to fit exactly within a regular tetrahedron having triangular faces. The reference unit cell mesh is symmetric with respect to the arrangement of cell mesh nodes on the triangular faces. The method includes mapping the reference unit cell meshes respectively into the tetrahedral elements of the driver mesh, through the use of basis functions defined on each of the tetrahedral elements in a manner causing adjustment of the reference unit cell meshes to conform respectively to the tetrahedral elements, and resulting in an infill geometry comprised of mapped unit cell meshes. The method additionally includes stitching together the mapped unit cell meshes to result in a stitched mesh, and optionally smoothing the stitched mesh through one or more mesh smoothing operations.

20 Claims, 29 Drawing Sheets

(56) References Cited

U.S. PATENT DOCUMENTS

| | | |
|---|---|---|
| 2015/0017383 A1 | 1/2015 | Yang |
| 2015/0175210 A1 | 6/2015 | Raymond |
| 2019/0337220 A1 | 11/2019 | Beyerle |
| 2020/0272131 A1 | 8/2020 | Wang |
| 2021/0061495 A1 | 3/2021 | Aston |
| 2024/0095423 A1 | 3/2024 | Elford |

OTHER PUBLICATIONS

McCaw, John CS, and Enrique Cuan-Urquizo. "Curved-layered additive manufacturing of non-planar, parametric lattice structures." Materials & design 160 (2018): 949-963. (Year: 2018).*

Guo, Ye, Ke Liu, and Zeyun Yu. "Tetrahedron-based porous scaffold design for 3d printing." Designs 3.1 (2019): 16. (Year: 2019).*

Provaggi, Elena, et al. "3D printing assisted finite element analysis for optimising the manufacturing parameters of a lumbar fusion cage." Materials & Design 163 (2016): 107540. (Year: 2019).*

Liu, Fei, et al. "Shell offset enhances mechanical and energy absorption properties of SLM-made lattices with controllable separated voids." Materials & Design 217 (2022): 110630. (Year: 2022).*

Feng, Jiawei, et al. "Sandwich panel design and performance optimization based on triply periodic minimal surfaces." Computer-Aided Design 115 (2019): 307-322. (Year: 2019).*

McCaw, John CS, and Enrique Cuan-Urquizo. "Curved-layered additive manufacturing of non-planar, parametric lattice structures." Materials & design 16 (2018): 949-963. (Year: 2018).*

Allaire, Grégoire, et al. "Structural optimization under overhang constraints imposed by additive manufacturing technologies." Journal of Computational Physics 351 (2017): 295-328. (Year: 2017).*

Bityukov, Yuri, et al. "Application of wavelets and conformal reflections to finding optimal scheme of fiber placement at 3d printing constructions from composition materials." E3S web of conferences. vol. 244. EDP Sciences, 2021. (Year: 2021).*

Geoffroy-Donders, Perle, Grégoire Allaire, and Olivier Pantz. "3-d topology optimization of modulated and oriented periodic microstructures by the homogenizaton method." Journal of Computational Physics 401 (2020): 108994. (Year: 2020).*

Anderson et al., "Automated All-Quadrilateral Mesh Adaptation through Refinement and Coarsening," Proceedings of the 18th International Meshing Roundtable, Jan. 2009, pp. 557-574.

Simsek Ugur et al: "Parametric studies on vibration characteristics of triply periodic minimum surface sandwich lattice structures", The International Journal of Advanced Manufacturing Technology, Springer, London, vol. 115, No. 3, Oct. 7, 2020, pp. 675-690.

Xiao Xiao et al: "Infill topology and shape optimisation of lattice-skin structures", arxiv.org, Cornell University Library, 201 Olin Library Cornell University, Ithaca, NY 14853, Oct. 28, 2021.

Ye Guo et al.: "Tetrahedron-Based Porous Scaffold Design for 3D Printing", Designs, vol. 3, No. 1, Feb. 18, 2019, pp. 1-17.

Elena Provaggi et al.: "3D printing assisted finite element analysis for optimising the manufacturing parameters of a lumbar fusion cage", Materials & Design, vol. 163, Dec. 6, 2018.

Fei Liu et al.: "Functionally graded porous scaffolds in multiple patterns: New design method, physical and mechanical properties", Materials & Design, Elsevier, Amsterdam, NL, vol. 160, Oct. 3, 2018.

Xiangyu Ma et al.: "A novel design method for TPMS lattice structures with complex contour based on moving elements method", Research Square, Mar. 5, 2022, pp. 1-18.

Rati Verma et al.: "Design and Analysis of Biomedical Scaffolds Using TPMS-Based Porous Structures Inspired from Additive Manufacturing", Coatings, vol. 12, No. 6, Jun. 15, 2022.

EPO, Extended European Search Report for appl. No. 23183229.6 issued on Mar. 21, 2024.

Yang, Nan, et al. "Multi-morphology transition hybridization CAD design of minimal surface porous structures for use in tissue engineering." Computer-Aided Design 56 (2014): 11-21. (Year: 2014).

Marschall, David, et al.: "Boundary conformal design of laser sintered sandwich cores and simulation of graded lattice cells using a forward homogenization approach", Materials & Design, Elsevier, Amsterdam, NL, vol. 190, Feb. 7, 2020 (Feb. 7, 2020).

Jason Nguyen et al.: "Conformal Lattice Structure Design and Fabrication", Laboratory for Freeform Fabrication, Jan. 1, 2012, pp. 138-161.

Dong-Jin Yoo: "Computer-aided porous scaffold design for tissue engineering using triply periodic minimal surfaces", International Journal of Precision Engineering and Manufacturing, vol. 12, No. 1, Feb. 1, 2011, pp. 61-71.

Niu Jie et al.: "Numerical study on load-bearing capabilities of beam-like lattice structures with three different unit cells", International Journal of Mechanics and Materials in Design, Springer Netherlands, Dordrecht, vol. 14, No. 3, Jul. 26, 2017 (Jul. 26, 2017), pp. 443-460.

* cited by examiner

700 ─┐

702 — PROVIDING A DRIVER MESH REPRESENTING A SOLID VERSION OF THE BODY, THE DRIVER MESH IS COMPRISED OF A PLURALITY OF TETRAHEDRAL ELEMENTS

704 — PROVIDING A REFERENCE UNIT CELL MESH CONFIGURED TO FIT EXACTLY WITHIN A REGULAR TETRAHEDRON HAVING TRIANGULAR FACES, AND THE REFERENCE UNIT CELL MESH IS SYMMETRIC WITH RESPECT TO THE TRIANGULAR FACES

706 — MAPPING A PLURALITY OF THE REFERENCE UNIT CELL MESHES RESPECTIVELY INTO THE PLURALITY OF TETRAHEDRAL ELEMENTS OF THE DRIVER MESH THROUGH THE USE OF BASIS FUNCTIONS DEFINED ON EACH OF THE PLURALITY OF TETRAHEDRAL ELEMENTS, IN A MANNER CAUSING ADJUSTMENT OF THE SIZE AND SHAPE OF THE PLURALITY OF REFERENCE UNIT CELL MESHES TO CONFORM RESPECTIVELY TO THE PLURALITY OF TETRAHEDRAL ELEMENTS, AND RESULTING IN AN INFILL GEOMETRY COMPRISED OF A PLURALITY OF MAPPED UNIT CELL MESHES

708 — STITCHING TOGETHER THE MAPPED UNIT CELL MESHES TO RESULT IN A STITCHED MESH REPRESENTING THE INFILL GEOMETRY

710 — PERFORMING ONE OR MORE SMOOTHING OPERATIONS ON THE STITCHED MESH, TO RESULT IN A SMOOTHED MESH

FIG. 4

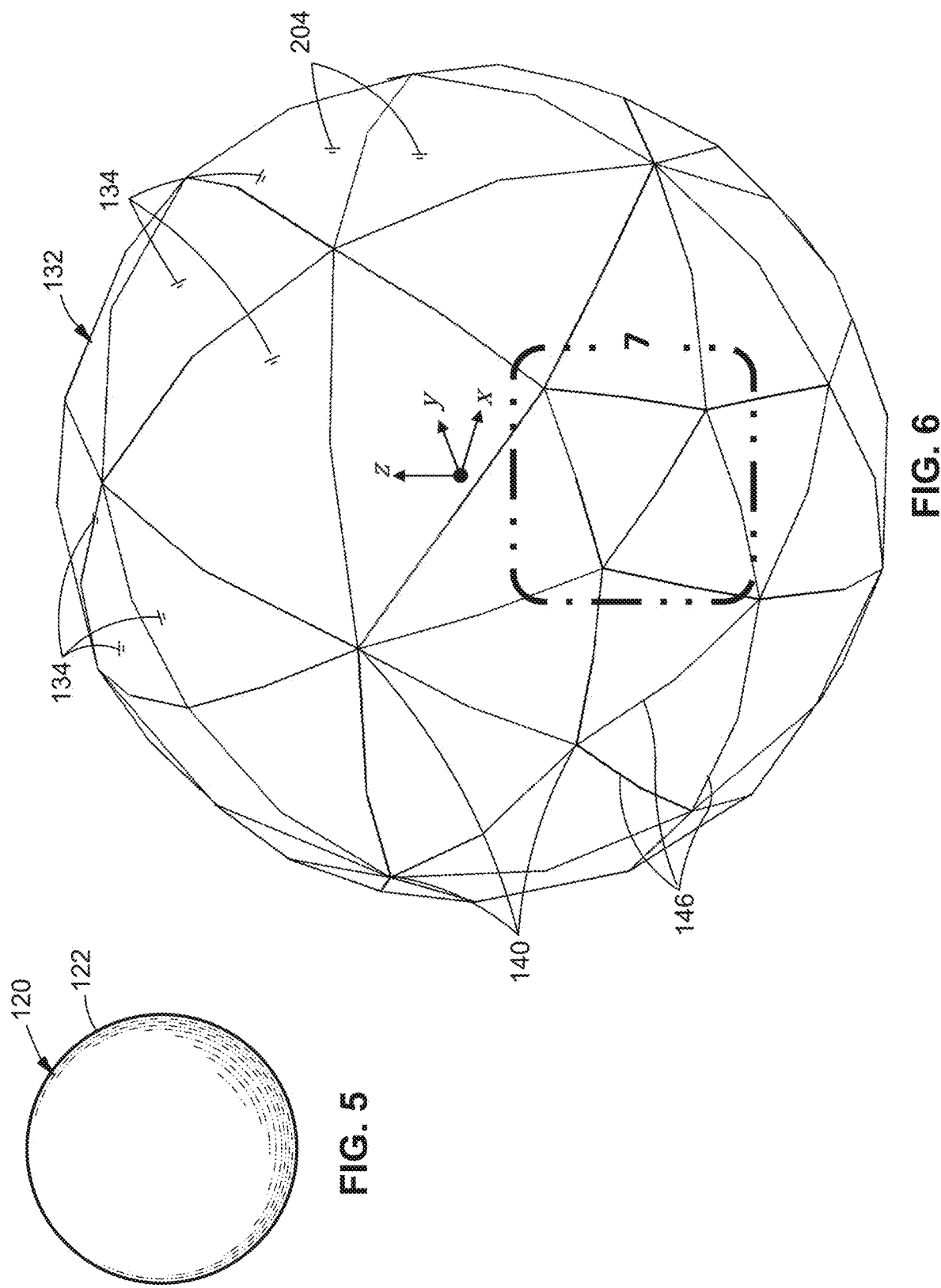

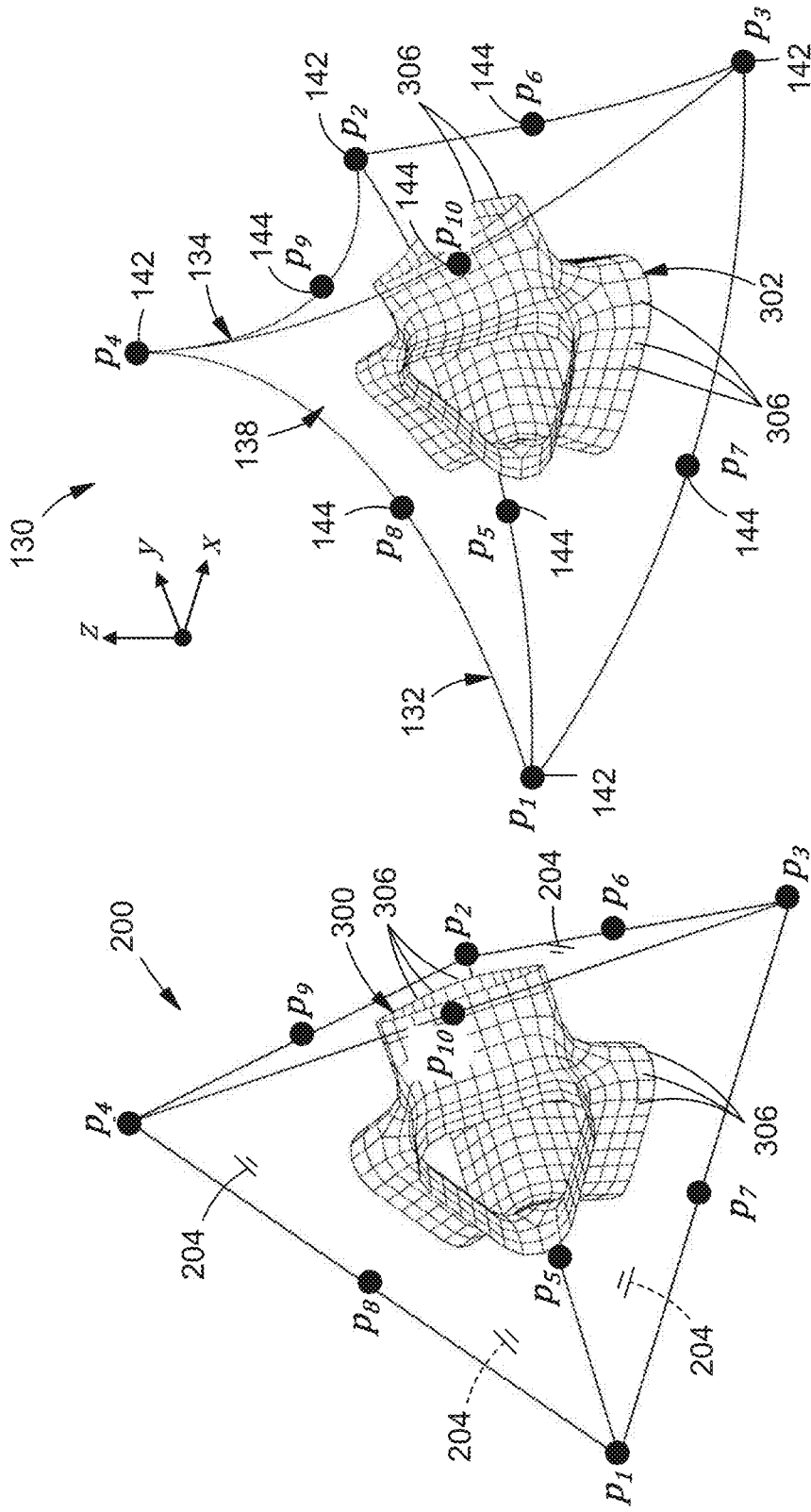

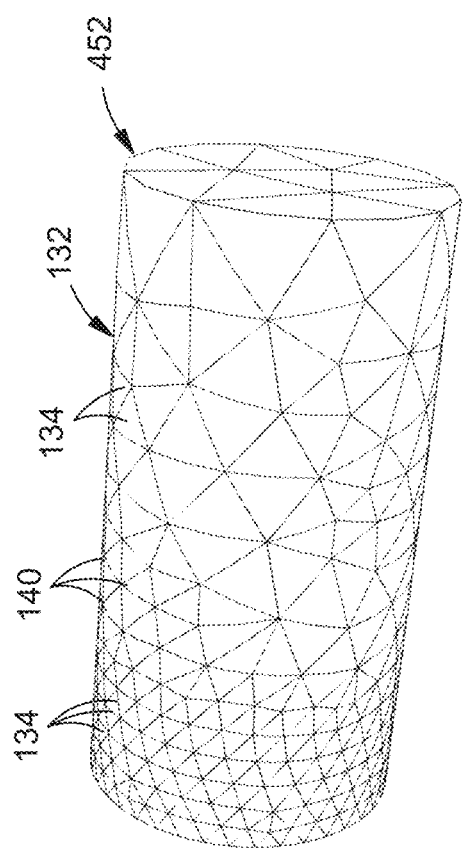
FIG. 30
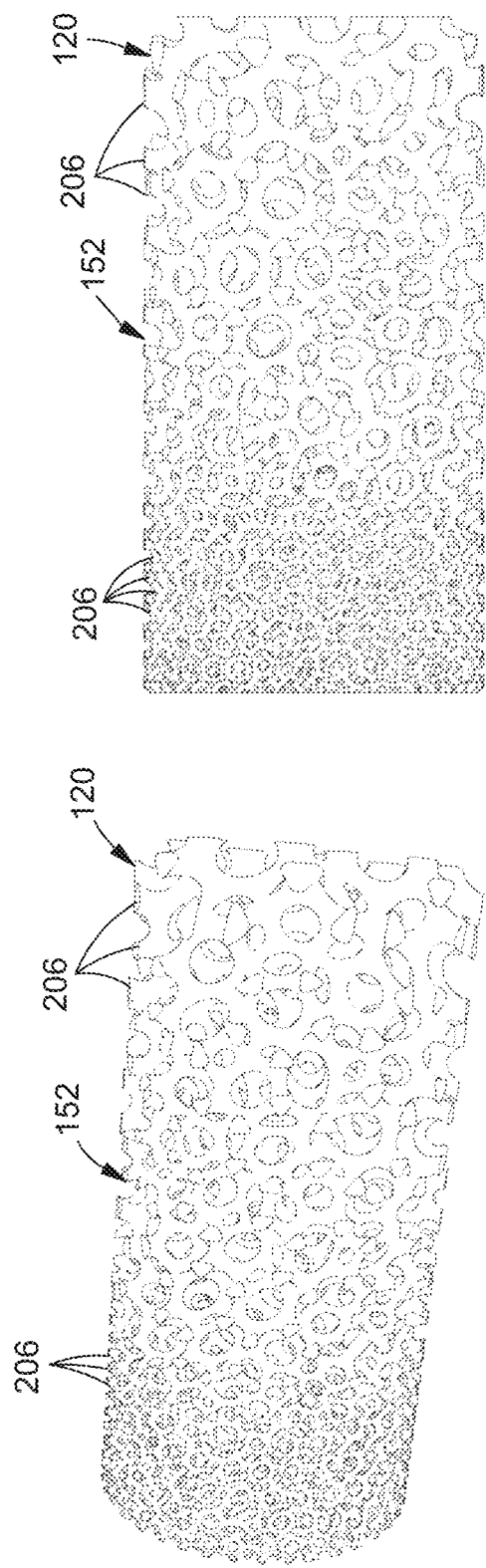
FIG. 32
FIG. 31

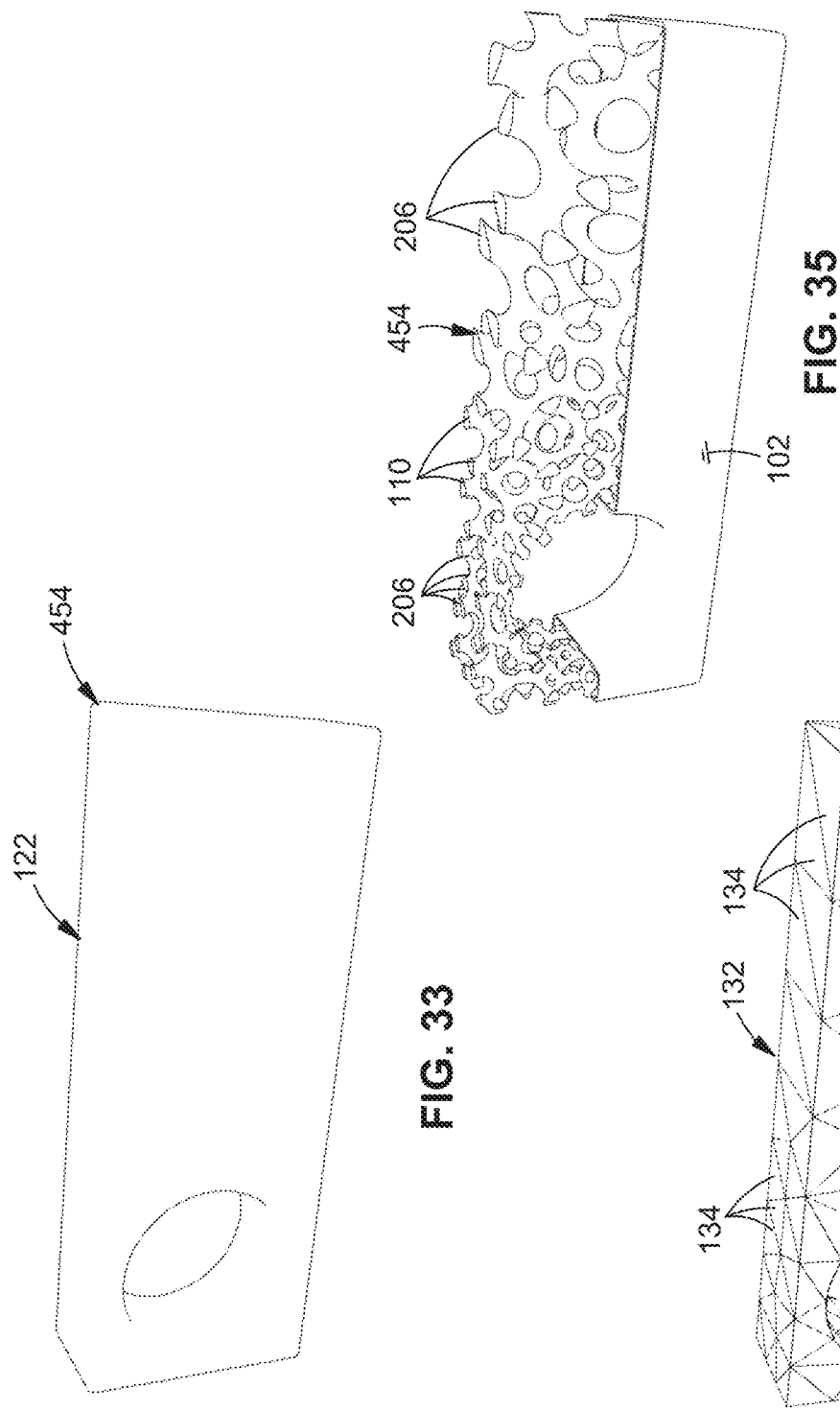

SYSTEM AND METHOD FOR GENERATING AN INFILL GEOMETRY OF A BODY

FIELD

The present disclosure relates generally to additive manufacturing and, more particularly, to a system and method for generating an infill geometry for an additively manufacturable three-dimensional body.

BACKGROUND

Additive manufacturing is a process of fabricating a three-dimensional object or body via the successive application and solidification of layers of material on top of each other. An additively manufactured body can include an inner core, covered by an outer skin. The inner core can have an infill geometry comprised of interconnected surfaces or members, resulting in a body that is lighter weight than a body having a solid inner core.

The conventional process of additively manufacturing a three-dimensional body involves fabricating the inner core based on a prior art infill geometry. A prior art infill geometry has an orthogonally-repeating structural pattern of uniform size and shape. During additive manufacturing, only the portion of the structural pattern that falls inside the envelope of the outer skin is fabricated. This results in an irregular and inconsistent topology at the interfaces between the inner core and the outer skin. The shape of certain interface locations can result in stress concentrations when the body is mechanically loaded.

As can be seen, there exists a need in the art for a method of generating an infill geometry for an inner core of a three-dimensional body in a manner that results in a consistent topology at the interface locations between the inner core and the outer skin.

SUMMARY

The above-noted needs associated with the infill geometry of additively manufactured bodies are addressed by the present disclosure, which provides a method of generating an infill geometry of a body, comprising providing a driver mesh representing a solid version of the body. The driver mesh is comprised of a plurality of tetrahedral elements. The method additionally includes providing a reference unit cell mesh configured to fit exactly within a regular tetrahedron having triangular faces. The reference unit cell mesh is made up of a plurality of cell mesh elements and associated cell mesh nodes. The reference unit cell mesh is symmetric with respect to the arrangement of the cell mesh nodes on the triangular faces. The method also includes mapping a plurality of the reference unit cell meshes respectively into the plurality of tetrahedral elements of the driver mesh, through the use of basis functions defined on each of the plurality of tetrahedral elements in a manner causing adjustment of the size and shape of the plurality of reference unit cell meshes to conform respectively to the plurality of tetrahedral elements, and resulting in an infill geometry comprised of a plurality of mapped unit cell meshes. In addition, the method includes stitching together the mapped unit cell meshes to result in a stitched mesh representing the infill geometry of the body.

Also disclosed is a processor-based system for generating an infill geometry of a three-dimensional body. The processor-based system includes a memory device configured to store a driver mesh and a reference unit cell mesh. The driver mesh represents a solid version of the body, and is comprised of a plurality of tetrahedral elements. The reference unit cell mesh is made up of a plurality of cell mesh elements and associated cell mesh nodes. The reference unit cell mesh is configured to fit exactly within a regular tetrahedron having triangular faces, and the reference unit cell mesh is symmetric with respect to the arrangement of the cell mesh nodes on the triangular faces. The processor-based system also includes a unit cell mapping module configured to map a plurality of the reference unit cell meshes respectively into the plurality of tetrahedral elements of the driver mesh, through the use of basis functions defined on of the plurality of tetrahedral elements in a manner causing adjustment of the size and shape of the plurality of reference unit cell meshes to conform respectively to the plurality of tetrahedral elements, and resulting in an infill geometry comprised of a plurality of mapped unit cell meshes.

Additionally, disclosed is a body, comprising an outer skin and an infill structure. The infill structure comprises a plurality of unit cell structures connected to each other to form a lattice extending through an interior of the body, and an outermost layer of the unit cell structures is connected to the outer skin, and all interfaces between the unit cell structures and the outer skin have the same topology. Each unit cell structure has the following characteristics: each unit cell structure is configured to fit exactly within a tetrahedral element having triangular faces, and each unit cell structure is symmetric with respect to the arrangement of cell mesh nodes on the triangular faces.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 4 is a flowchart of operations included in a method of generating an infill geometry of a three-dimensional body;

FIG. 5 is a perspective view of an example of a driver digital model (e.g., a 3D computer-aided-design model) of a three-dimensional body in the shape of a sphere;

FIG. 6 is a perspective view of an example of a driver mesh generated by meshing the driver digital model of FIG. 5, and showing a plurality of tetrahedral elements that make up the driver mesh;

FIG. 18 is a perspective view of the reference unit cell mesh contained within a 10-noded regular tetrahedron;

FIG. 19 is a perspective view of the reference unit cell mesh of FIG. 18 mapped onto a quadratic tetrahedral element of a driver mesh;

FIG. 30 is a perspective view of an example of a driver mesh of a cylindrical body, and illustrating the spatial grading of the driver mesh;

FIG. 31 is a perspective view of an infill geometry generated by mapping a reference unit cell mesh onto the driver mesh of FIG. 30;

FIG. 32 is a side view of the infill geometry of FIG. 31;

FIG. 33 is a perspective view of an example of a driver digital model of a rectangular body having a through-hole;

FIG. 34 is a perspective view of an example of a driver mesh generated by meshing the driver digital model of FIG. 33, and illustrating the spatial grading of the driver mesh around the through-hole;

FIG. 35 is a perspective view of an additively manufacturable version of the rectangular body of FIG. 33, with the outer skin partially removed to reveal an infill geometry generated by mapping a reference unit cell mesh onto the driver mesh of FIG. 34;

The figures shown in this disclosure represent various aspects of the versions presented, and only differences will be discussed in detail.

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 2:
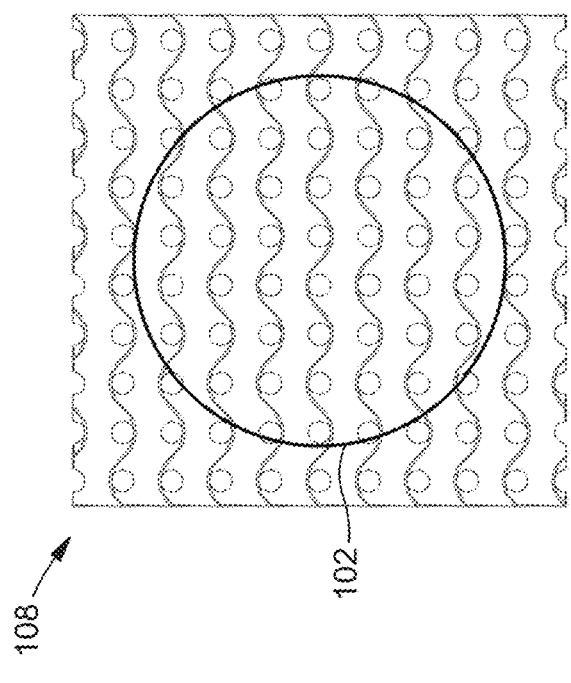
FIG. 2 is a perspective view of the outline of a spherical body, superimposed on the prior art infill geometry of FIG. 1.
Figure 3:
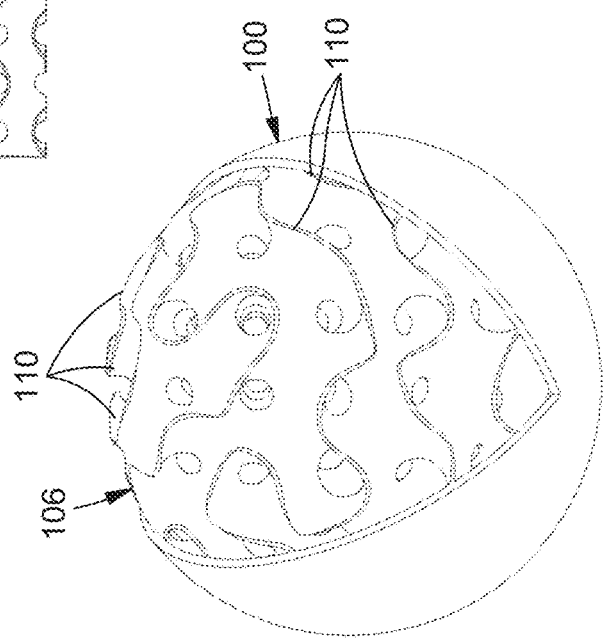
FIG. 3 is a perspective view of a body having an outer skin containing the inner core of FIG. 2, and showing the outer skin partially cut away to illustrate the irregular and inconsistent topology at the interfaces between the inner core and the outer skin.
Figure 1:
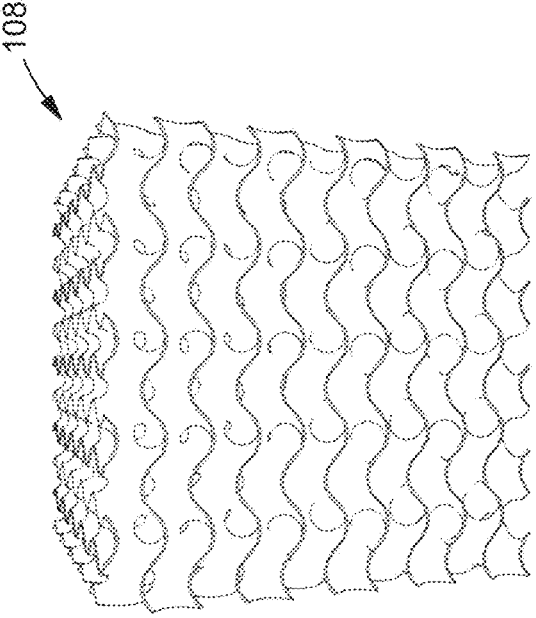
FIG. 1 is a perspective view of an inner core of a prior art body, in which the inner core has a prior art infill geometry.

Referring now to the drawings, shown in FIG. 1 is an example of a prior art infill geometry 108 of an inner core 106 for an additively-manufacturable three-dimensional prior art body 100. The prior art infill geometry 108 has an orthogonally-repeating structural pattern of uniform size and shape. In preparation for additively manufacturing a three-dimensional prior art body 100, conventional software computes the portion of the structural pattern that lies within the boundaries of the outer skin 102 of the prior art body 100, as shown in FIG. 2. This results in an irregular and inconsistent topology at the interfaces 110 between the inner core 106 and the outer skin 102, as shown in FIG. 3. As mentioned above, the shape of certain interface 110 locations can result in localized stress concentrations.

Figure 24:
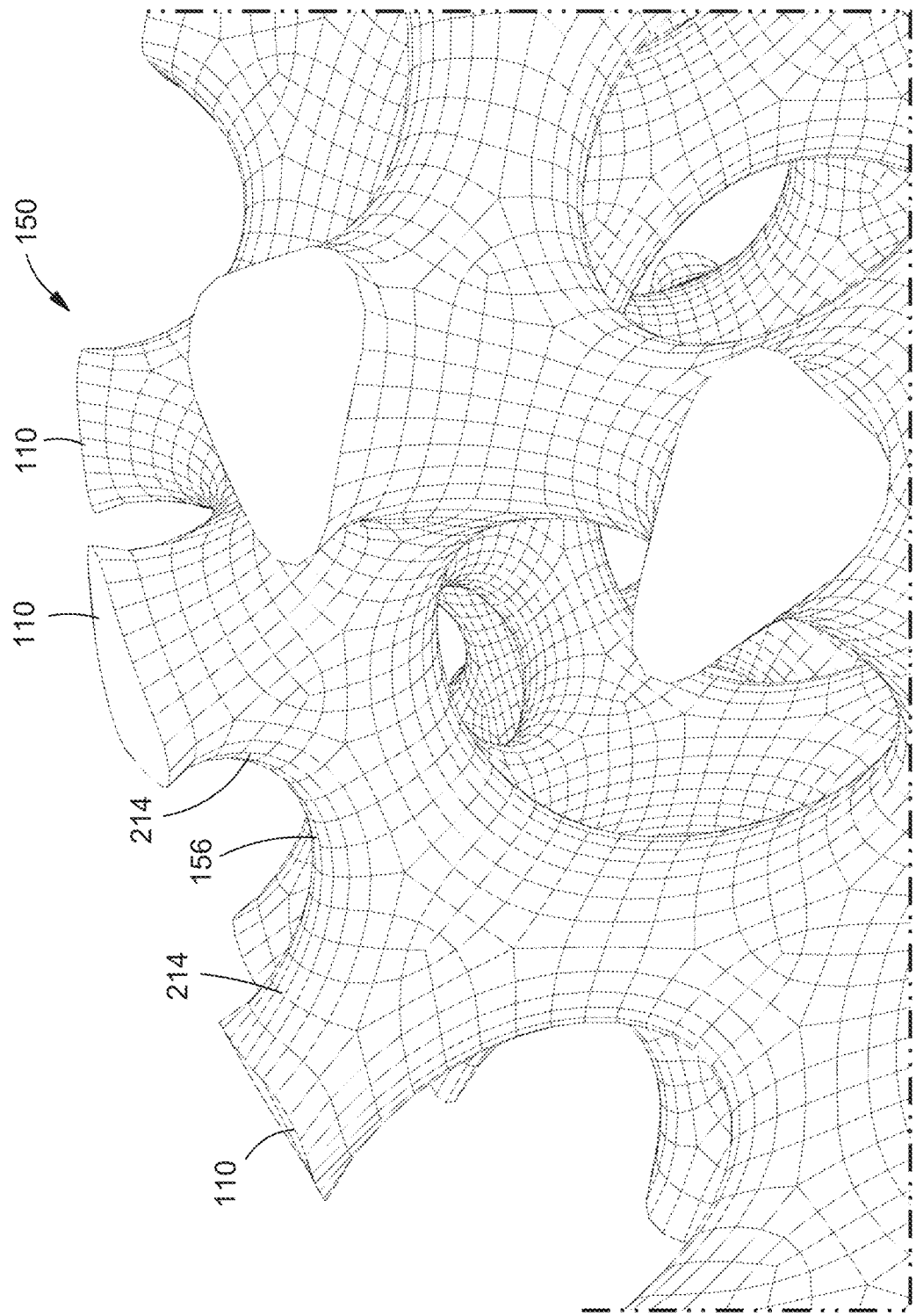
FIG. 24 is a magnified view of the portion of the smoothed mesh identified by reference numeral 24 of FIG. 23.
Figure 25:
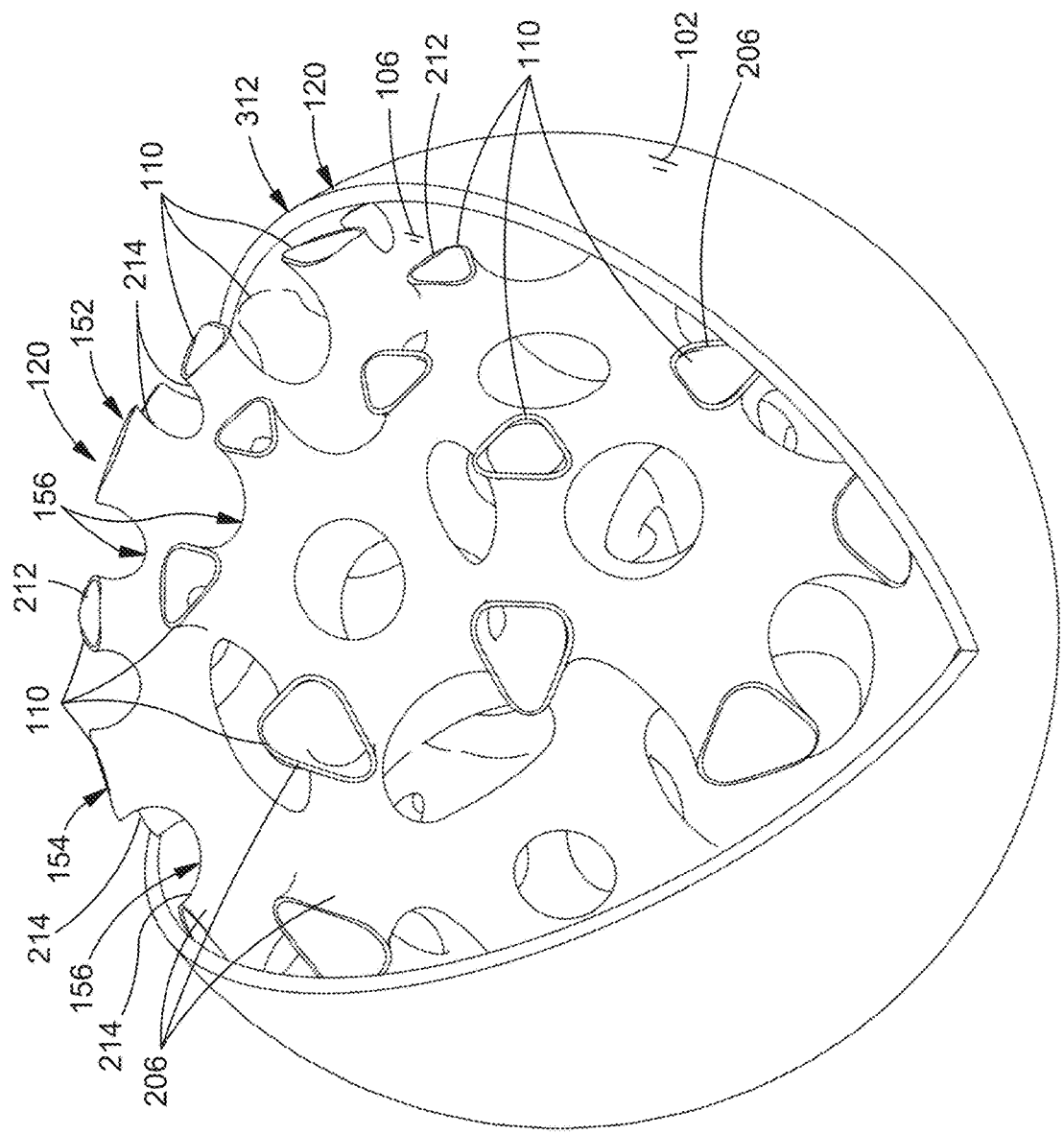
FIG. 25 is a perspective view of an additively manufacturable body generated by mapping the reference unit cell mesh of FIG. 8 onto the driver mesh of FIG. 6, and illustrating the consistent topology at the interfaces between the infill structure and the outer skin.

Referring to FIG. 4, with additional reference to FIGS. 5-25 shown in FIG. 4 is a flowchart of operations included in a method 700 of generating an infill geometry 152 (FIG. 25) for a three-dimensional body 120 (FIG. 25) of arbitrary shape, such as the spherical body in FIG. 25. Step 702 of the method 700 comprises providing a driver mesh 132 (FIG. 6) representing the size and shape of a solid version of the body 120. The driver mesh 132 is comprised of a plurality of tetrahedral elements 134 (FIG. 6). The tetrahedral elements 134 of the driver mesh 132 extend throughout the volume contained within the body 120. Each tetrahedral element 134 is comprised of driver mesh nodes 140 (FIG. 6). In addition, each tetrahedral element 134 includes edges 146 extending between the driver mesh nodes 140.

Figure 7:
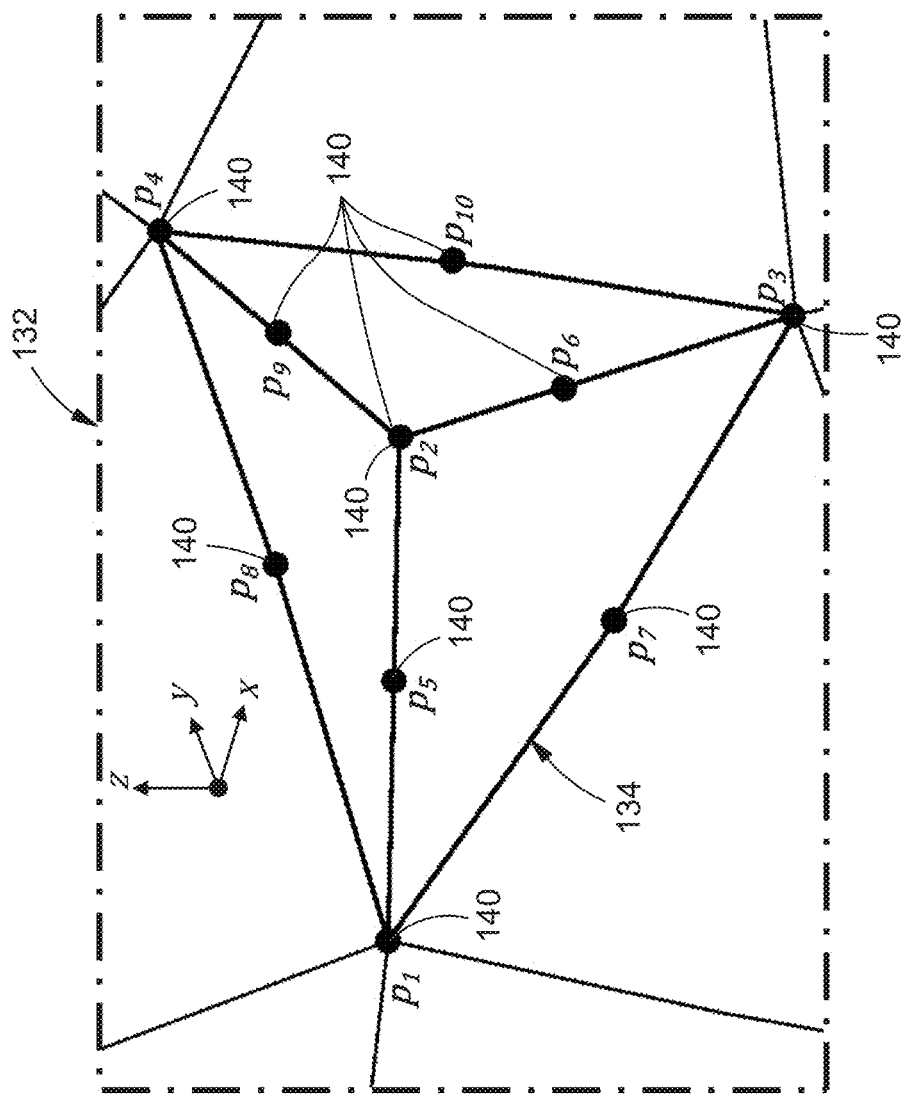
FIG. 7 is a magnified view of the portion of the driver mesh identified by reference numeral 7 of FIG. 6, and illustrating a plurality of driver mesh nodes of one of the tetrahedral elements of the driver mesh.

Referring to FIGS. 5-7, a driver mesh 132 may be constructed by meshing a driver digital model 122 (e.g., a computer-aided-design (CAD) model) of the body 120. FIG. 5 shows an example of a driver digital model 122 of a spherical body. FIG. 6 shows an example of a driver mesh 132 generated by meshing the driver digital model 122 of FIG. 5. FIG. 7 shows a portion of the driver mesh 132 of FIG. 6, illustrating a plurality of driver mesh nodes 140 of one of the tetrahedral elements 134 of the driver mesh 132. The meshing of a driver digital model 122 may be performed via a suitable meshing algorithm, which may optionally be hosted by a commercial software package (e.g., Abaqus CAE™, Patran™, Ansys Workbench™, etc.) or an open source software program (e.g., Gmsh). In some examples, step 702 of providing the driver mesh 132 comprises constructing the driver mesh 132 by performing three-dimensional Delaunay triangulation on a driver digital model 122 of the body 120. Additionally, in some examples, step 702 comprises providing a driver mesh 132 that is spatially graded over at least one region of the body 120, as shown in the examples of FIGS. 30-46 and described in greater detail below.

Figure 16:
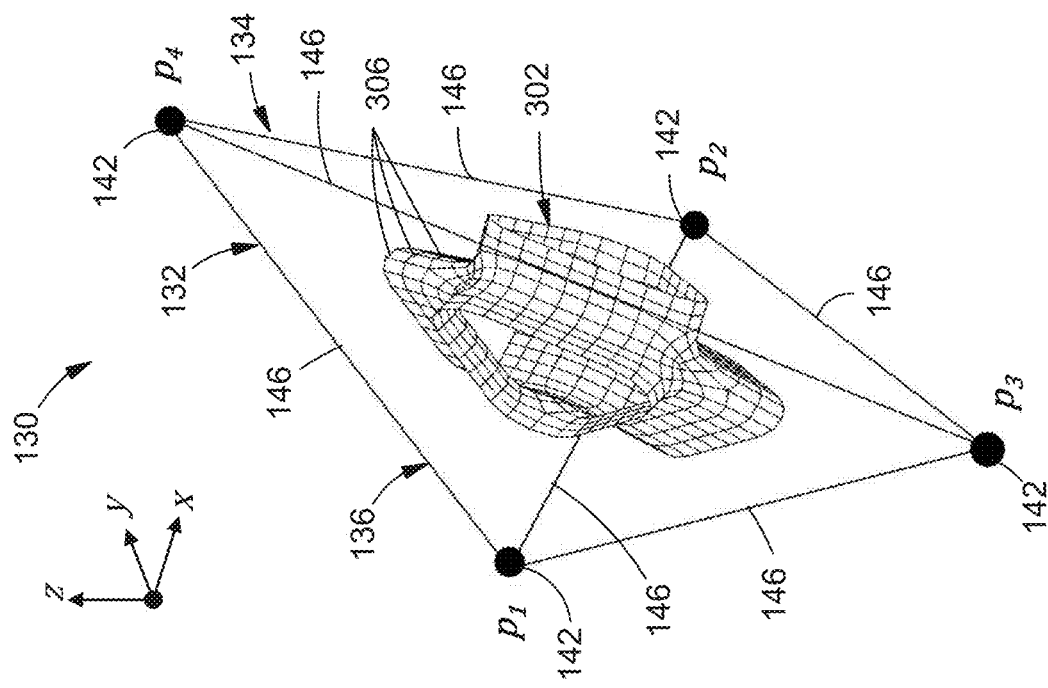
FIG. 16 is a perspective view of the reference unit cell mesh of FIG. 15 mapped onto a 4-noded linear tetrahedral element of a driver mesh.
Figure 15:
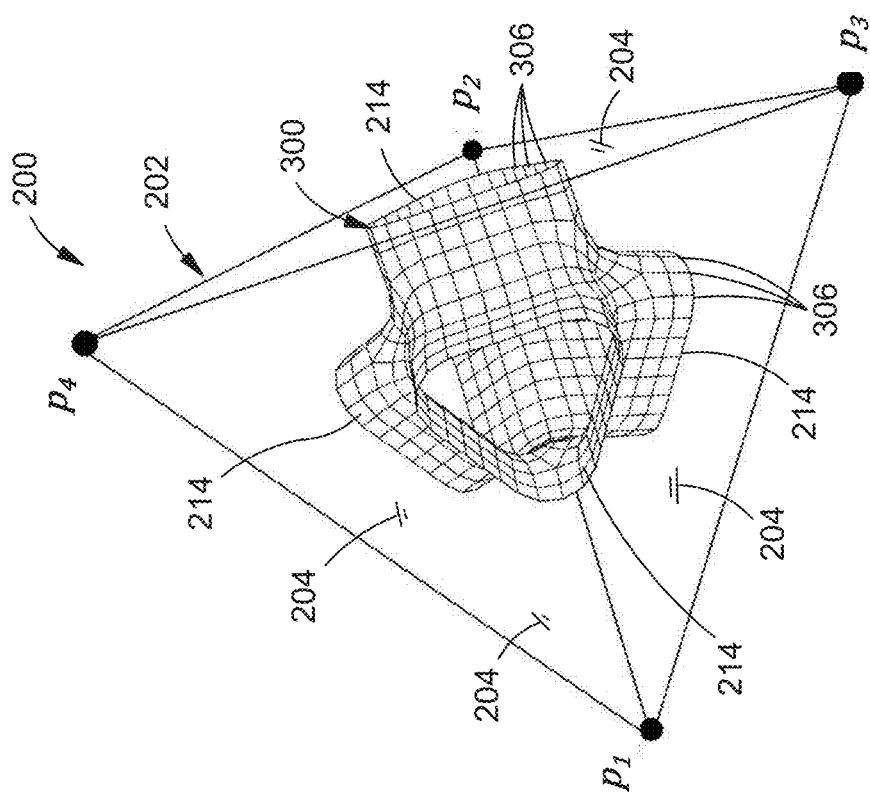
FIG. 15 is a perspective view of an example of a reference unit cell mesh contained within a regular tetrahedron having 4 corner nodes.
Figure 17:
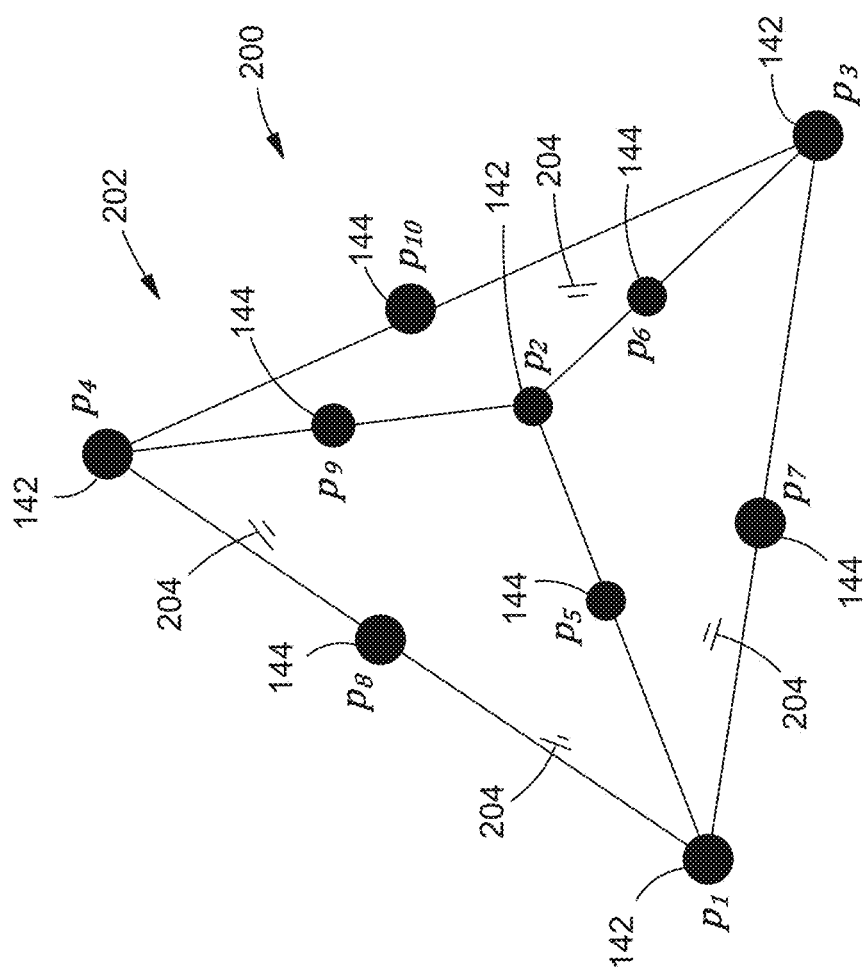
FIG. 17 is a perspective view of an example of a regular tetrahedron having 4 corner nodes and 6 mid-side nodes.

A driver mesh 132 can be made up of linear tetrahedral elements 136 (e.g., FIG. 16). Each linear tetrahedral element 136 has 4 corner nodes 142, such that each edge 146 of each linear tetrahedral element 136 consists of 2 corner nodes 142, as shown in FIGS. 15 and 16 and described in greater detail below. As an alternative to linear tetrahedral elements 136, a driver mesh 132 can be made up of quadratic tetrahedral elements 138 (e.g., FIG. 17), as may be desirable for bodies having a more complex geometry. As shown in FIG. 17, each quadratic tetrahedral element 138 has 4 corner nodes 142 and 6 mid-side nodes 144, such that each edge 146 of each quadratic tetrahedral element 138 consists of 2 corner nodes 142 and one mid-side node 144 located between the 2 corner nodes 142, as described in greater detail below.

Figure 9:
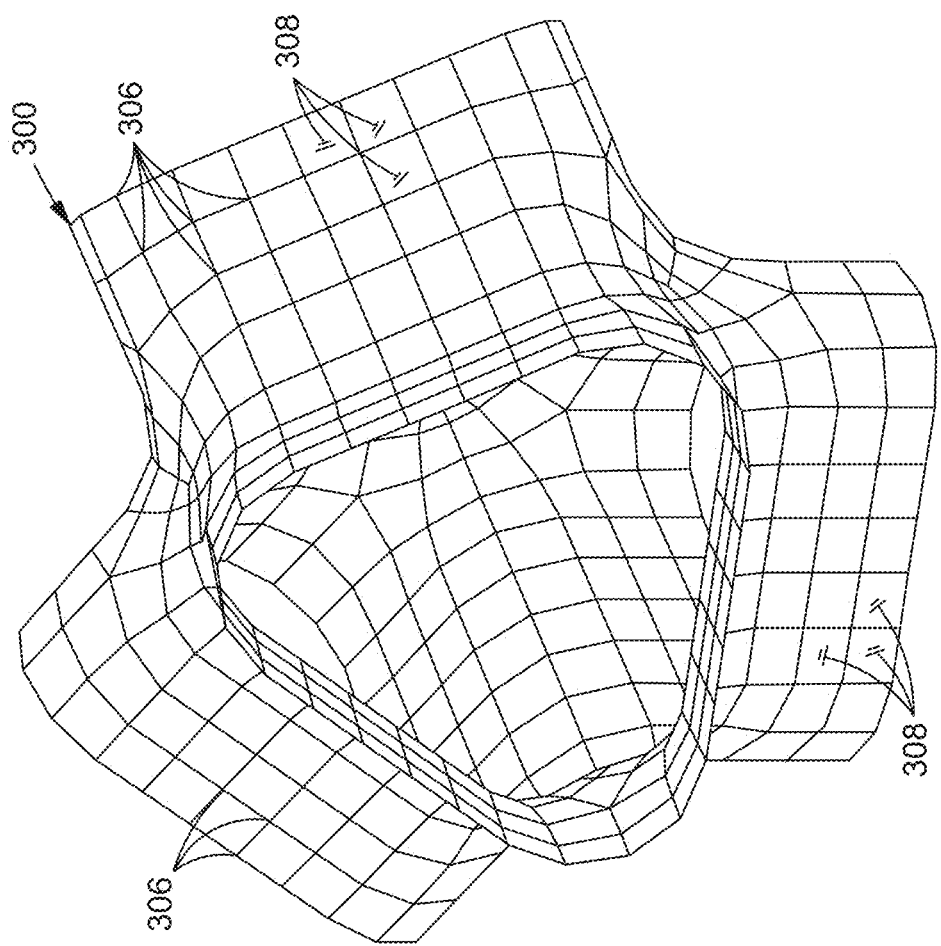
FIG. 9 is a perspective view of an example of a reference unit cell mesh representation of the hollow unit cell geometry of FIG. 8, and showing the reference unit cell mesh comprised of shell elements.
Figure 10:
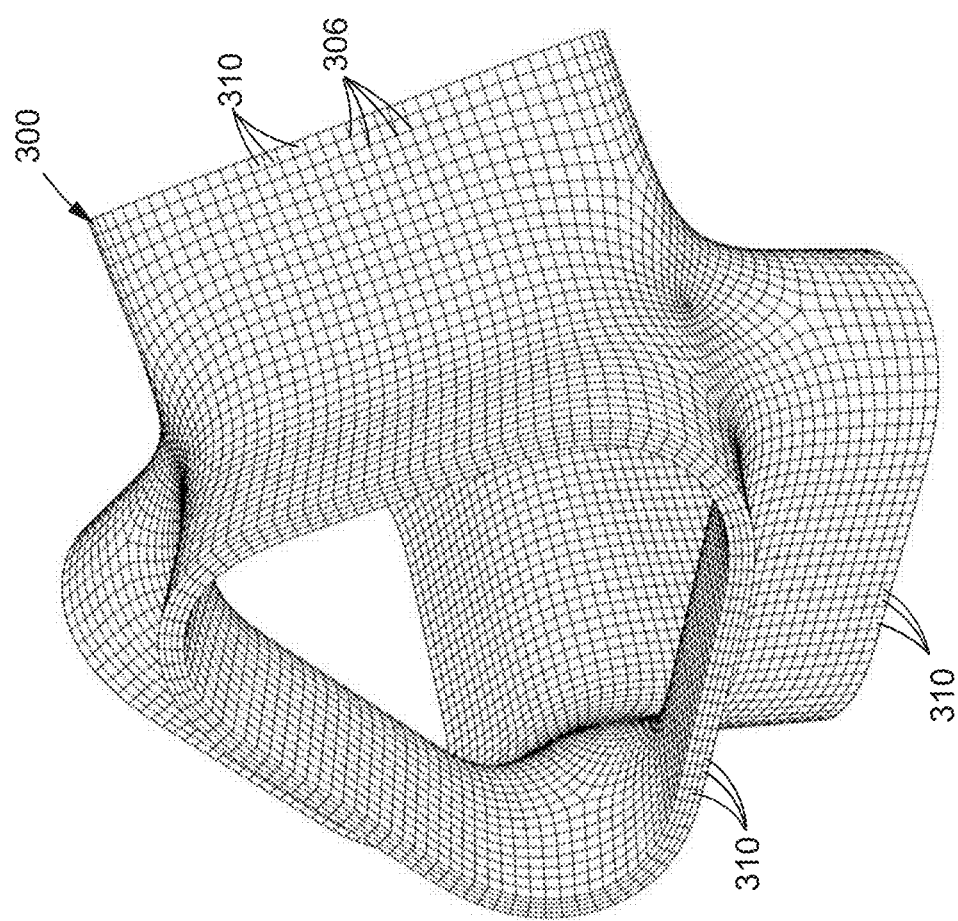
FIG. 10 is a perspective view of a reference unit cell mesh representation of the hollow unit cell geometry of FIG. 8, and showing the reference unit cell mesh comprised of hexahedral elements.
Figure 12:
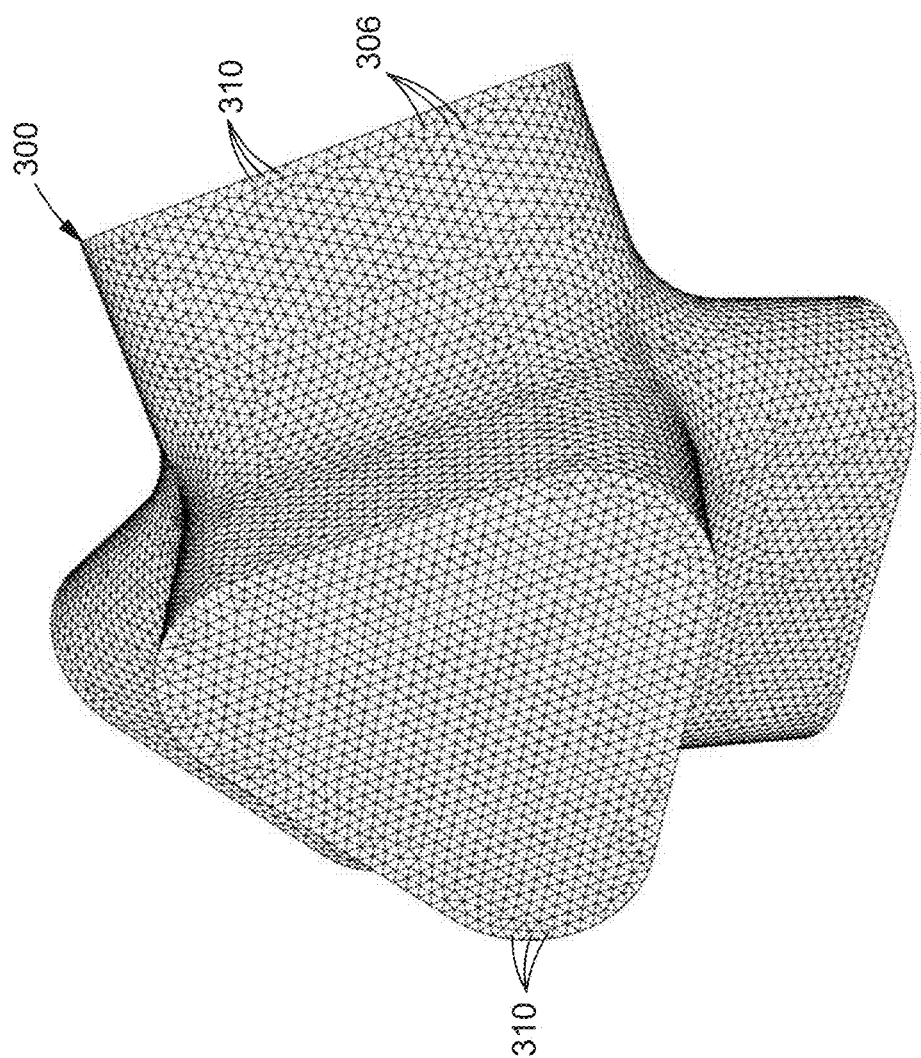
FIG. 12 is a perspective view of an example of a reference unit cell mesh representation of the solid unit cell geometry of FIG. 11, and showing the reference unit cell mesh comprised of tetrahedral elements.

Referring to FIGS. 18-19, step 704 of the method 700 comprises providing a reference unit cell mesh 300 (e.g., FIGS. 9, 10, and 12). The reference unit cell mesh 300 is made up of a plurality of cell mesh elements and associated cell mesh nodes 306. As described below, the cell mesh elements are either shell elements 308 or solid elements 310. The reference unit cell mesh 300 is configured to fit exactly within a regular tetrahedron 202, as shown in the example of FIG. 15. The regular tetrahedron 202 has 4 triangular faces 204, and the reference unit cell mesh 300 is symmetric with respect to the arrangement of the cell mesh nodes 306 on the triangular faces 204. In this regard, the reference unit cell mesh 300 may take the form of a 4-branch structure, having 4 cell branches 214 that intersect each other. As shown in FIG. 15, each cell branch 214 is oriented normal to one of the 4 triangular faces 204 of the regular tetrahedron 202. In the example shown, each cell branch 214 has a rounded triangular cross-sectional shape. However, in other examples not shown, the cell branches 214 can have alternative cross-sectional shapes, such as a circular cross-sectional shape. In still further examples not shown, the center of the reference unit cell mesh 300 can have a bubble-type shape from which the cell branches 214 extend. In yet further examples not shown, a reference unit cell mesh 300 can have 2 two or more cell branches 214 at each triangular face 204. The reference unit cell mesh 300 is not limited to having 4 cell branches 214.

Figure 8:
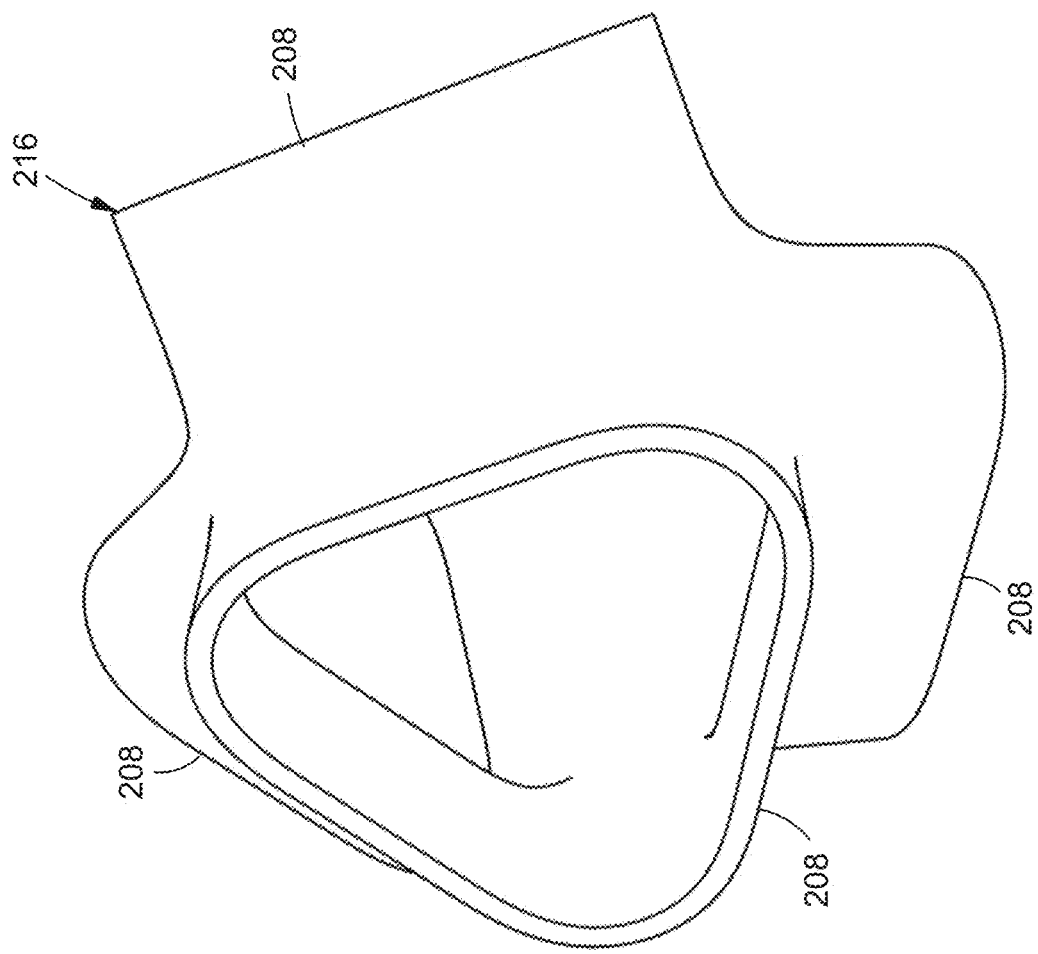
FIG. 8 is a perspective view of an example of a hollow version of a unit cell geometry.

Referring to FIGS. 8-12, shown in FIG. 8 is an example of a unit cell digital model 216 of a unit cell geometry 212. In the example shown, the unit cell geometry 212 is hollow. In this regard, each of the intersecting cell branches 214 is hollow. FIG. 9 shows an example of a reference unit cell mesh 300 representation of the hollow unit cell geometry 212 of FIG. 8. The reference unit cell mesh 300 of FIG. 9 is made up of shell elements 308. For a reference unit cell mesh 300 comprised of shell elements 308 (e.g., FIG. 9), step 704 of providing the reference unit cell mesh 300 comprises: constructing the reference unit cell mesh 300 as trimmed parametric surfaces, followed by meshing the trimmed parametric surfaces, to thereby result in a reference unit cell mesh 300 comprised of shell elements 308.

Figure 11:
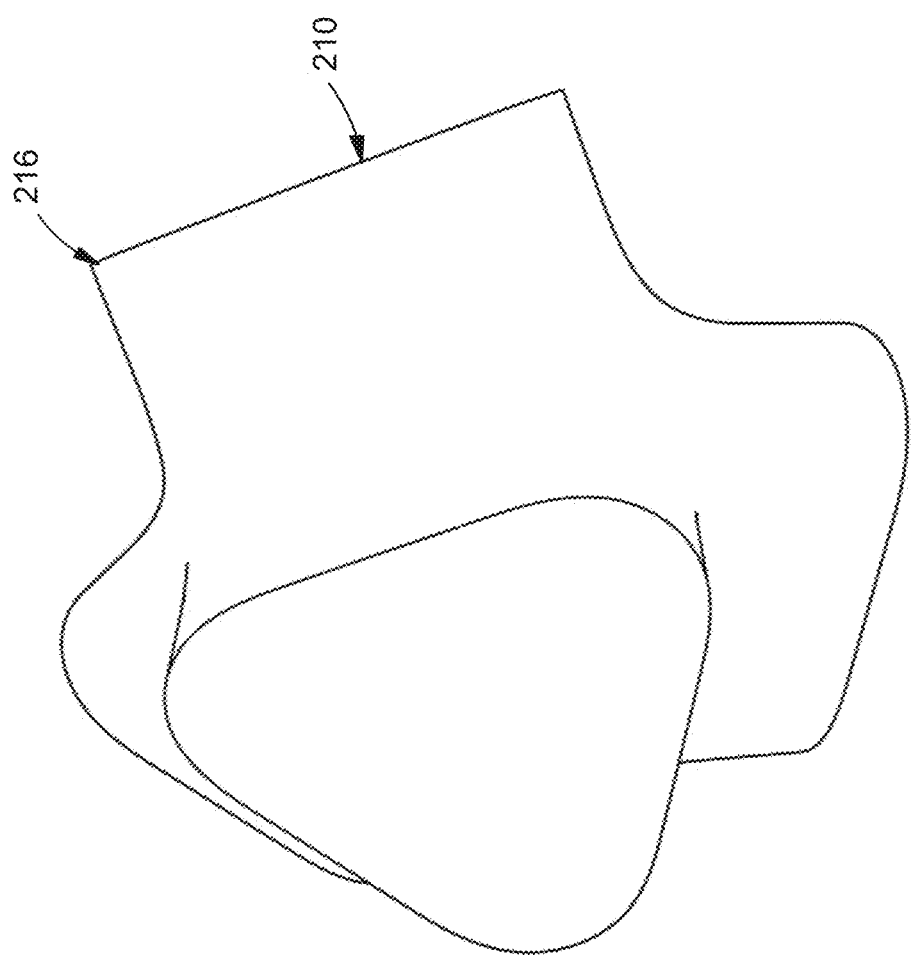
FIG. 11 is a perspective view of a solid version of the unit cell geometry of FIG. 8.

FIG. 10 shows a reference unit cell mesh 300 representation of the hollow unit cell geometry 212 of FIG. 8. The reference unit cell mesh 300 of FIG. 10 is comprised of solid elements 310 which, in the example shown, are hexahedral elements. In this regard, the branch walls 208 that define each hollow cell branch 214 are comprised of hexahedral elements. FIG. 11 shows an example of a unit cell digital model 216 of a solid structure 210 (i.e., a non-hollow structure) representing the unit cell geometry 212 of FIG. 8. FIG. 12 shows an example of a reference unit cell mesh 300 representation of the solid unit cell geometry 212 of FIG. 11. The reference unit cell mesh 300 of FIG. 12 is comprised of solid elements 310 which, in the example shown, are tetrahedral elements. For a reference unit cell mesh 300 comprised of solid elements 310 (e.g., FIGS. 10 and 12), step 704 of providing the reference unit cell mesh 300 comprises: constructing the reference unit cell mesh 300 represented by one or more trimmed parametric surfaces enclosing a volume, followed by meshing the volume, to thereby result in the reference unit cell mesh 300 composed of solid elements 310.

Figure 23:
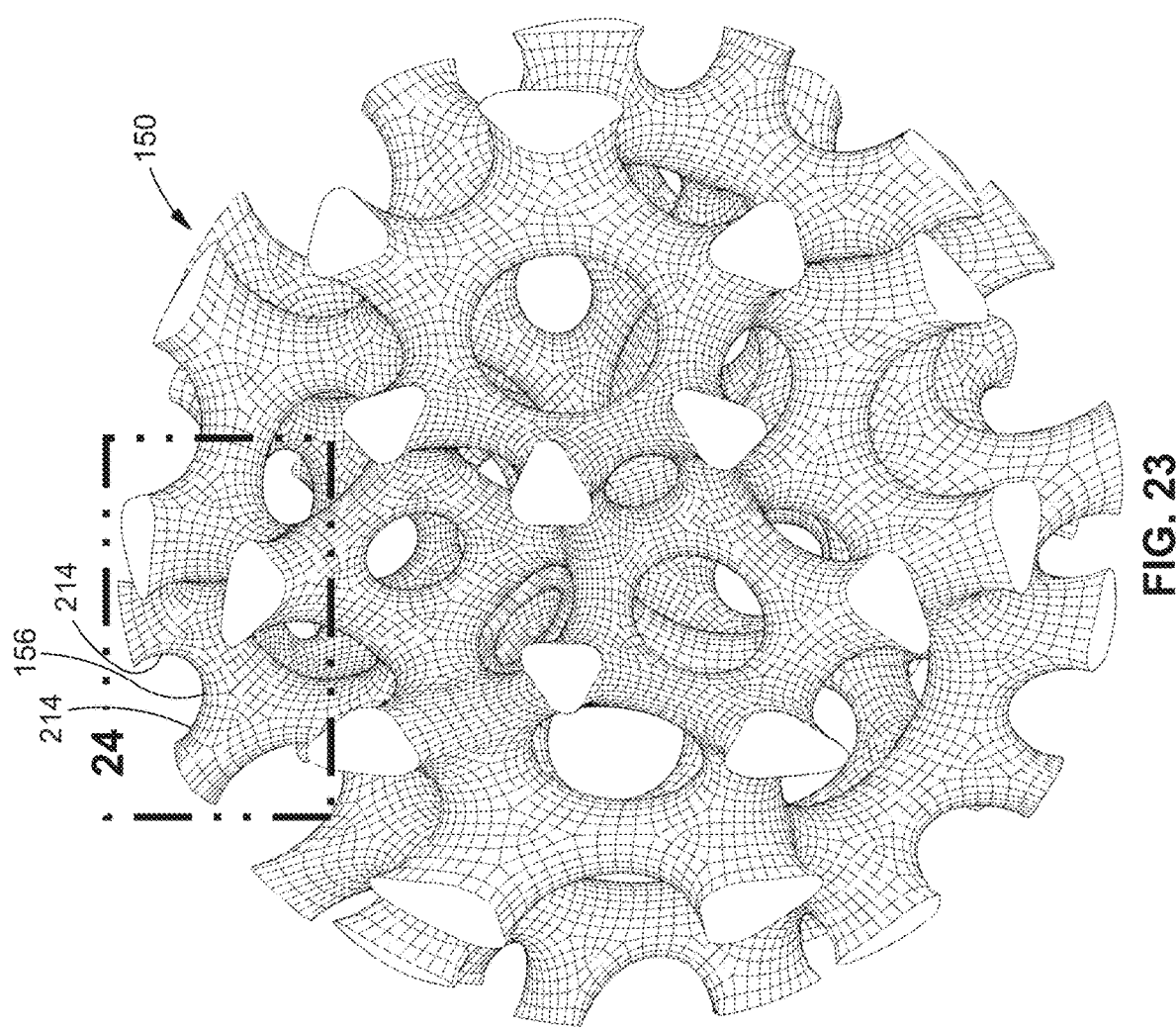
FIG. 23 is a perspective view of an example of a smoothed mesh, generated by performing a plurality of smoothing operations on the stitched mesh of FIG. 20.

When a reference unit cell mesh 300 is mapped onto a driver mesh 132 as described below, the symmetric nature of the reference unit cell mesh 300 results in an infill geometry 152 comprised of mapped unit cell meshes 302 that are positioned in adjacent relation to each other (e.g., FIGS. 20-21). The cell branches 214 of adjacent mapped unit cell meshes 302 are stitched together to form a continuous stitched mesh 148. As described in greater detail below, smoothing operations are then performed on the stitched mesh 148 to result in a smoothed mesh 150, as shown in FIGS. 23-24. When stitched meshes 148 undergo multiple smoothing operations, the stitched meshes 148 converge into a smoothed mesh 150 of generally the same shape, regardless of the different initial shapes of the reference unit cell meshes 300 that are respectively mapped to the stitched meshes 148, provided the reference unit cell meshes 300 have the same topology. In preparation for the additive manufacturing of a body 120 (FIG. 25), a smoothed mesh 150 is converted into a body digital representation 312. The resulting infill structure 154 of the additively manufactured body 120 is comprised of interconnected unit cell structures 206, as shown in FIG. 25 and described below.

Referring now to FIGS. 13-20, step 706 of the method 700 comprises mapping a plurality of the reference unit cell meshes 300 (FIGS. 15 and 18) respectively onto the plurality of tetrahedral elements 134 (FIGS. 16 and 19) of the driver mesh 132, through the use of basis functions defined on each of the plurality of tetrahedral elements 134. As described in greater detail below, the process of mapping via basis functions is performed in a manner causing adjustment of the size and shape of the plurality of reference unit cell meshes 300 to conform respectively to the size and shape of the plurality of tetrahedral elements 134, and results in an infill geometry 152 (FIG. 20) comprised of a plurality of mapped unit cell meshes 302 (FIG. 20) that fit respectively within the plurality of tetrahedral elements 134 of the driver mesh 132. The reference unit cell mesh 300 is described in parameter space 200 according to a tetrahedron volume coordinate system having coordinates $\zeta_1, \zeta_2, \zeta_3, \zeta_4$, defined in a regular tetrahedron 202, as shown in the example of FIG. 15. The 4 coordinates $(\zeta_1, \zeta_2, \zeta_3, \zeta_4)$ sum to 1 at any given point within the tetrahedron ($\zeta_1+\zeta_2+\zeta_3+\zeta_4=1$). The driver mesh 132 is described in real space 130 according to a real space coordinate system (e.g., having x, y, z axes) as shown in the example of FIG. 16. After mapping is complete, the result is an infill geometry 152 comprised of a plurality of mapped unit cell meshes 302 that are connected to each other and to the outer skin 102 of the body 120 (e.g., FIG. 25). In this regard, the body 120 is of unitary construction. Advantageously, the presently-disclosed mapping process results in a consistent topology (i.e., the same shape or footprint) at the interfaces 110 (FIG. 25) between the infill geometry 152 and the outer skin 102.

Figure 13:
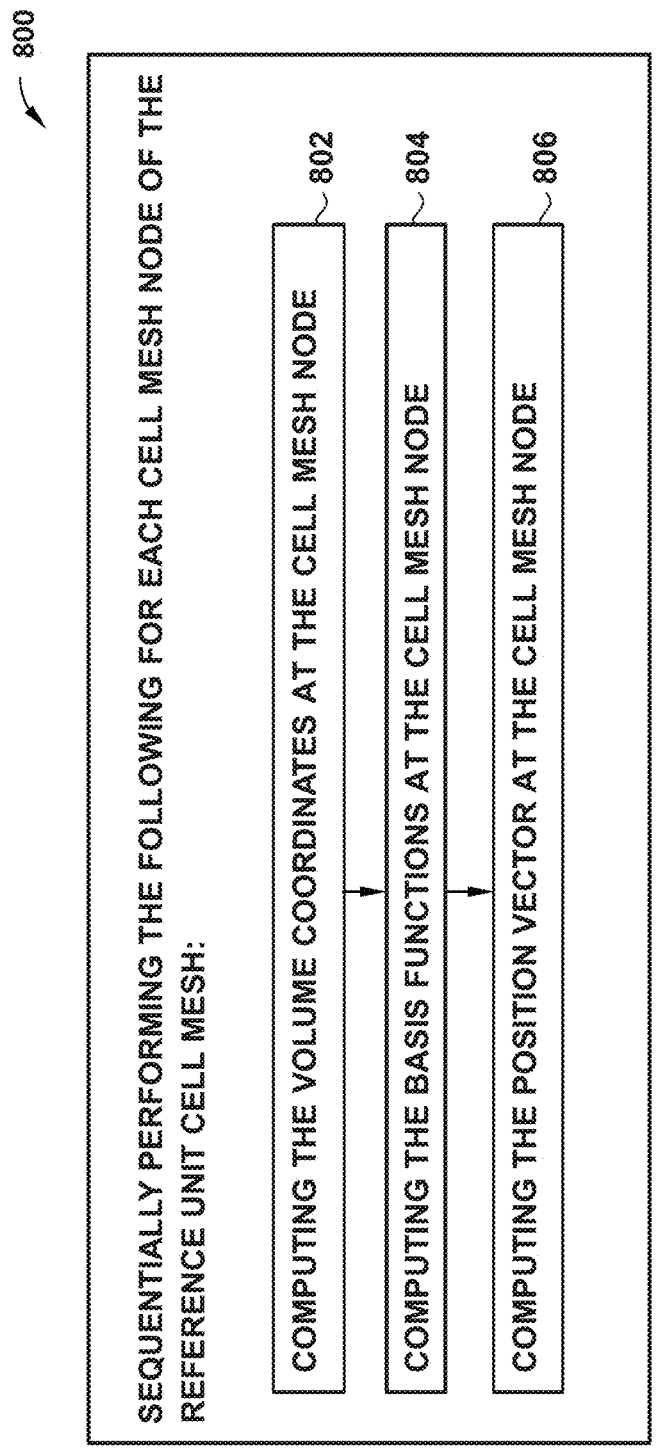
FIG. 13 is a flowchart of operations included in a method of mapping a reference unit cell mesh onto a linear tetrahedral element of a driver mesh.

Step 706 of mapping the plurality of reference unit cell meshes 300 respectively onto the plurality of tetrahedral elements 134 of the driver mesh 132 is now described with reference to the method 800 of FIG. 13. The method 800 is performed for each tetrahedral element 134 of the driver mesh 132, and comprises sequentially performing steps 802, 804, and 806 for each cell mesh node 306 of the reference unit cell mesh 300.

Figure 14:
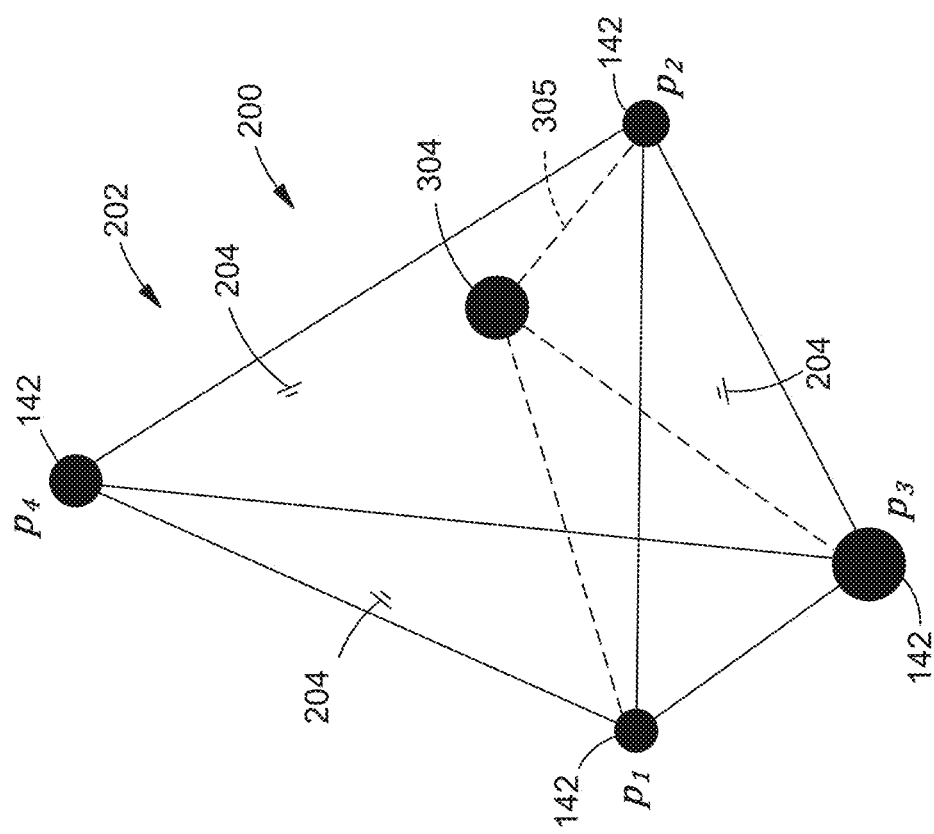
FIG. 14 is a perspective view of an example of a regular tetrahedron having 4 corner nodes, and further illustrating a point of interest and a tetrahedron of interest fully contained within the regular tetrahedron.

Referring to FIGS. 14-16, the method 800 is initially described for examples where the driver mesh 132 (FIG. 16) is comprised of linear tetrahedral elements 136 (FIG. 16). For such examples, the process of mapping includes using linear basis functions to map the plurality of reference unit cell meshes 300 onto the linear tetrahedral elements 136 of the driver mesh 132. As mentioned above, each linear tetrahedral element 136 has 4 corner nodes 142, which are identified as $p_1 \ldots p_4$, in real space 130, as shown in the example of FIG. 16. FIGS. 14 and 15 show a regular tetrahedron 202 defining a parameter space 200, and the corresponding location of the corner nodes 142, identified as $p_1 \ldots p_4$, on the regular tetrahedron 202. FIG. 14 additionally shows a point of interest 304 (e.g., a cell mesh node 306) contained within the regular tetrahedron 202. Also shown is a tetrahedron of interest 305, fully contained within the regular tetrahedron 202. The tetrahedron of interest 305 is defined by corner nodes $p_1, p_2, p_3$ and the point of interest 304. FIG. 15 additionally shows an example of a reference unit cell mesh 300 contained within the regular tetrahedron 202.

In the context of the present disclosure, basis functions describe the value of a point of interest within a region, using a weighted combination of values at points around the point of interest. In FIG. 14, the point of interest 304 is a cell mesh node 306 (FIG. 15) that is being mapped onto a linear tetrahedral element 136 (FIG. 16) of the driver mesh 132 (FIG. 16). For linear basis functions, the points around the point of interest 304 are the corner nodes 142. Referring to FIG. 15, step 802 of the method 800 includes computing the volume coordinates $\zeta_1, \zeta_2, \zeta_3, \zeta_4$ at the cell mesh node 306 in parameter space 200, using the following equations:

$$\zeta_1 = \frac{V_{P234}}{V_{1234}} \quad \text{(Equation 602)}$$

$$\zeta_2 = \frac{V_{P134}}{V_{1234}} \quad \text{(Equation 604)}$$

$$\zeta_3 = \frac{V_{P124}}{V_{1234}} \quad \text{(Equation 606)}$$

$$\zeta_4 = \frac{V_{P123}}{V_{1234}} \quad \text{(Equation 608)}$$

wherein, referring to FIG. 14:

$V_{1234}$ is the volume of the regular tetrahedron defined by points $p_1$, $p_2$, $p_3$, $p_4$;

$V_{P234}$ is the volume of the tetrahedron defined by the point of interest 304 and points $p_2$, $p_3$, $p_4$;

$V_{P134}$ is the volume of the tetrahedron defined by the point of interest 304 and points $p_1$, $p_3$, $p_4$;

$V_{P124}$ is the volume of the tetrahedron defined by the point of interest 304 and points $p_1$, $p_2$, $p_4$; and $V_{P123}$ is the volume of the tetrahedron defined by the point of interest 304 and points $p_1$, $p_2$, $p_3$.

After the volume coordinates are computed, step 804 is performed, which includes computing the linear basis functions $N_1 \ldots N_4$ at the cell mesh node 306, using the following equations:

$$N_1 = \zeta_1 \quad \text{(Equation 610)}$$

$$N_2 = \zeta_2 \quad \text{(Equation 612)}$$

$$N_3 = \zeta_3 \quad \text{(Equation 614)}$$

$$N_4 = \zeta_4 \quad \text{(Equation 616)}$$

After the linear basis functions are computed, step 806 is performed, which includes computing the position vector $p = (p_x, p_y, p_z)$ at the cell mesh node 306 in real space 130, using the following equations:

$$p_x = \Sigma_{i=1}^{4} N_i p_{i_x} \quad \text{(Equation 618)}$$

$$p_y = \Sigma_{i=1}^{4} N_i p_{i_y} \quad \text{(Equation 620)}$$

$$p_z = \Sigma_{i=1}^{4} N_i p_{i_z} \quad \text{(Equation 622)}$$

wherein $p_{i_x}$, $p_{i_y}$, and $p_{i_z}$ are respectively the x, y, and z components of the corner nodes 142 (i. e., points $p_1 \ldots p_4$) in real space 130.

As mentioned above, steps 802, 804, and 806 are sequentially performed for each cell mesh node 306 of the reference unit cell mesh 300. FIG. 16 shows a mapped unit cell mesh 302 resulting from mapping the reference unit cell mesh 300 of FIG. 15 onto the linear tetrahedral element 136 of FIG. 16. The mapping process is repeated for each linear tetrahedral element 136 of the driver mesh 132.

Referring to FIGS. 17-19, the method 800 is now described for examples where the driver mesh 132 is comprised of quadratic tetrahedral elements 138. For such examples, the process of mapping includes using quadratic basis functions to map the plurality of reference unit cell meshes 300 onto each of the quadratic tetrahedral elements 138 of the driver mesh 132. As mentioned above, each quadratic tetrahedral element 138 has 4 corner nodes 142 ($p_1 \ldots p_4$) and 6 mid-side nodes 144 ($p_5 \ldots p_{10}$) in real space 130, as shown in the example of FIGS. 18 and 19. FIGS. 17 and 18 show a regular tetrahedron 202 defining parameter space 200, and the corresponding location of the corner nodes $p_1 \ldots p_4$ and mid-side nodes ($p_5 \ldots p_{10}$) on the regular tetrahedron 202. The point of interest 304 is the cell mesh node (FIG. 18) being mapped. FIG. 18 additionally shows the reference unit cell mesh 300 contained within the regular tetrahedron 202.

Referring to FIG. 18, step 802 of the method 800 includes computing the volume coordinates $\zeta_1, \zeta_2, \zeta_3, \zeta_4$ at the cell mesh node 306 in parameter space 200, as described above using the above-listed equations. After the volume coordinates are computed, step 804 is performed, which includes computing the quadratic basis functions $N_1 \ldots N_{10}$ of the cell mesh node 306, using the following equations:

$$N_1 = 2\zeta_1(\zeta_1 - 0.5) \quad \text{(Equation 624)}$$

$$N_2 = 2\zeta_2(\zeta_2 - 0.5) \quad \text{(Equation 626)}$$

$$N_3 = 2\zeta_3(\zeta_3 - 0.5) \quad \text{(Equation 628)}$$

$$N_4 = 2\zeta_4(\zeta_4 - 0.5) \quad \text{(Equation 630)}$$

$$N_5 = 4\zeta_1\zeta_2 \quad \text{(Equation 632)}$$

$$N_6 = 4\zeta_2\zeta_3 \quad \text{(Equation 634)}$$

$$N_7 = 4\zeta_1\zeta_3 \quad \text{(Equation 636)}$$

$$N_8 = 4\zeta_1\zeta_4 \quad \text{(Equation 638)}$$

$$N_9 = 4\zeta_2\zeta_4 \quad \text{(Equation 640)}$$

$$N_{10} = 4\zeta_3\zeta_4 \quad \text{(Equation 642)}$$

After the linear basis functions are computed, step 806 is performed, which includes computing the position vector $p = (p_x, p_y, p_z)^T$ at the cell mesh node 306 in real space 130, using the following equations:

$$p_x = \Sigma_{i=1}^{10} N_i p_{i_x} \quad \text{(Equation 644)}$$

$$p_y = \Sigma_{i=1}^{10} N_i p_{i_y} \quad \text{(Equation 646)}$$

$$p_z = \Sigma_{i=1}^{10} N_i p_{i_z} \quad \text{(Equation 648)}$$

Steps 802, 804, and 806 are sequentially performed for mapping each cell mesh node 306 of the reference unit cell mesh 300 onto the quadratic tetrahedral element 138. FIG. 19 shows a mapped unit cell mesh 302 resulting from mapping the reference unit cell mesh 300 of FIG. 18 onto the quadratic tetrahedral element 138 of FIG. 19. FIG. 20 shows the results of mapping the reference unit cell mesh 300 onto the tetrahedral elements 134 of the driver mesh 132 of FIG. 6.

Figure 20:
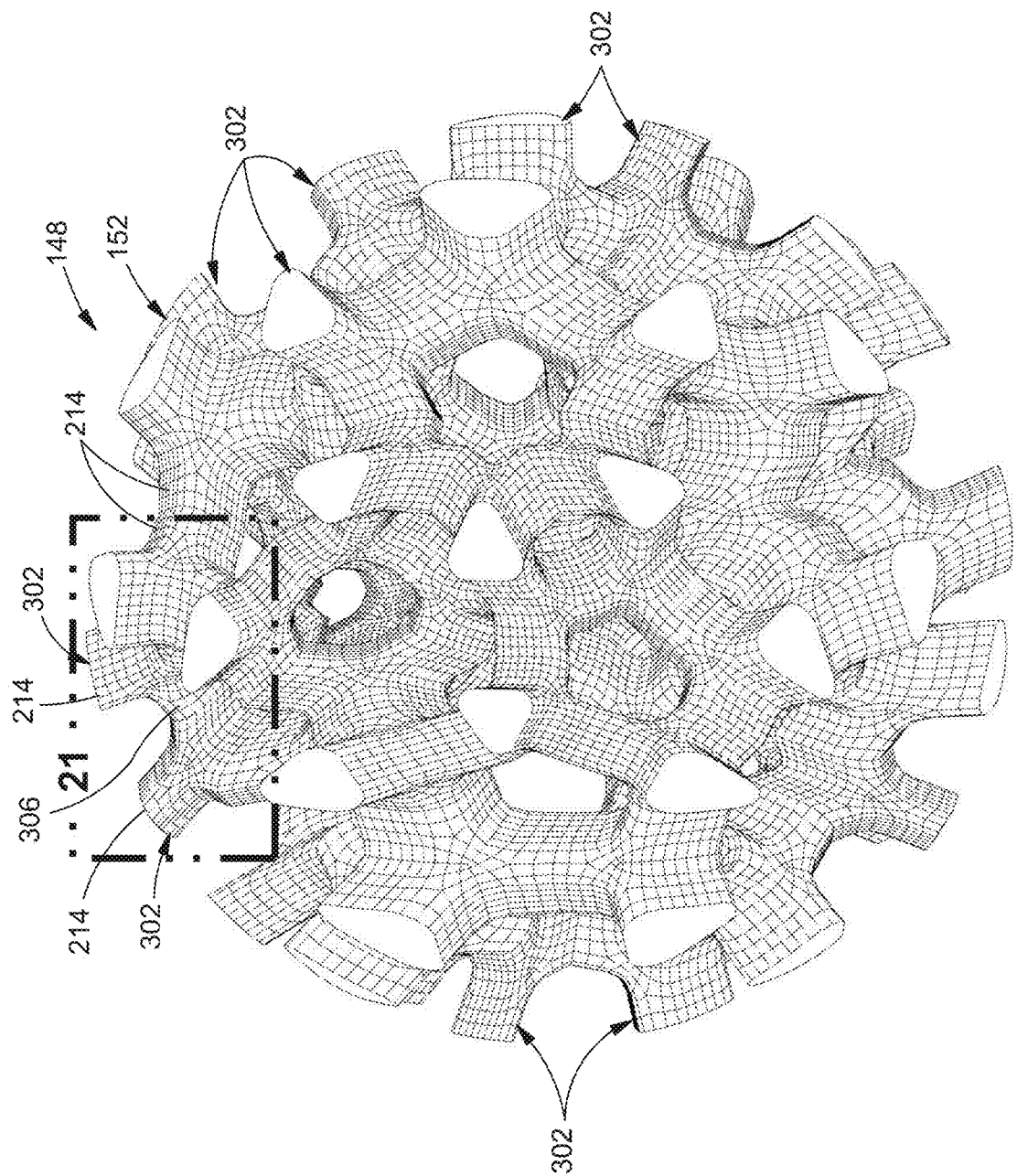
FIG. 20 is a perspective view of an example of an infill mesh comprised of a plurality of mapped unit cell meshes stitched together to form a stitched mesh.

Referring to FIG. 20, step 708 of the method 700 comprises stitching together the mapped unit cell meshes 302. During the stitching process, coincident cell mesh nodes 306 are merged, resulting in the stitching together of the cell branches 214 of adjacent mapped unit cell meshes 302.

Figure 21:
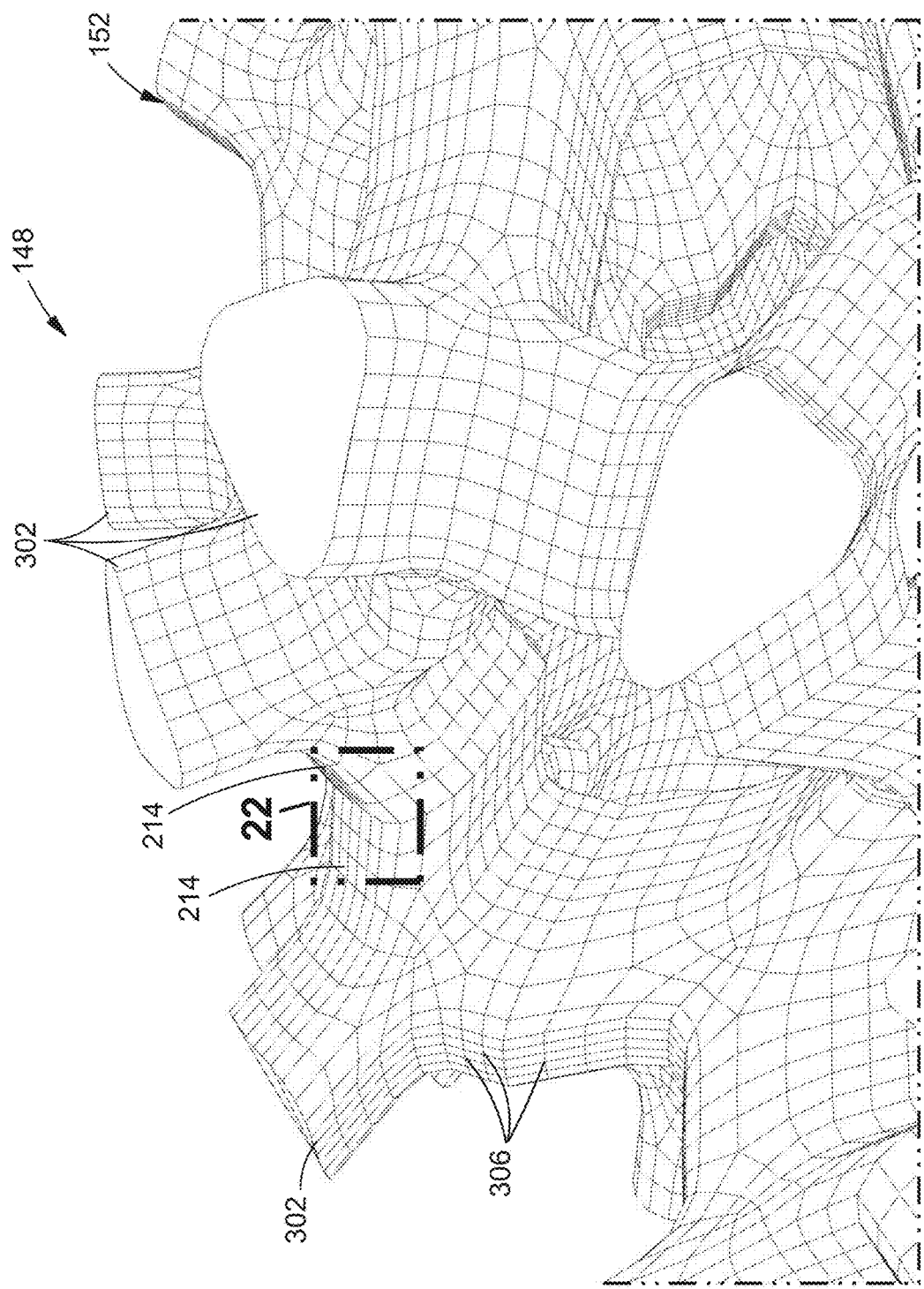
FIG. 21 is a magnified view of the portion of the stitched mesh identified by reference numeral 21 of FIG. 20.
Figure 22:
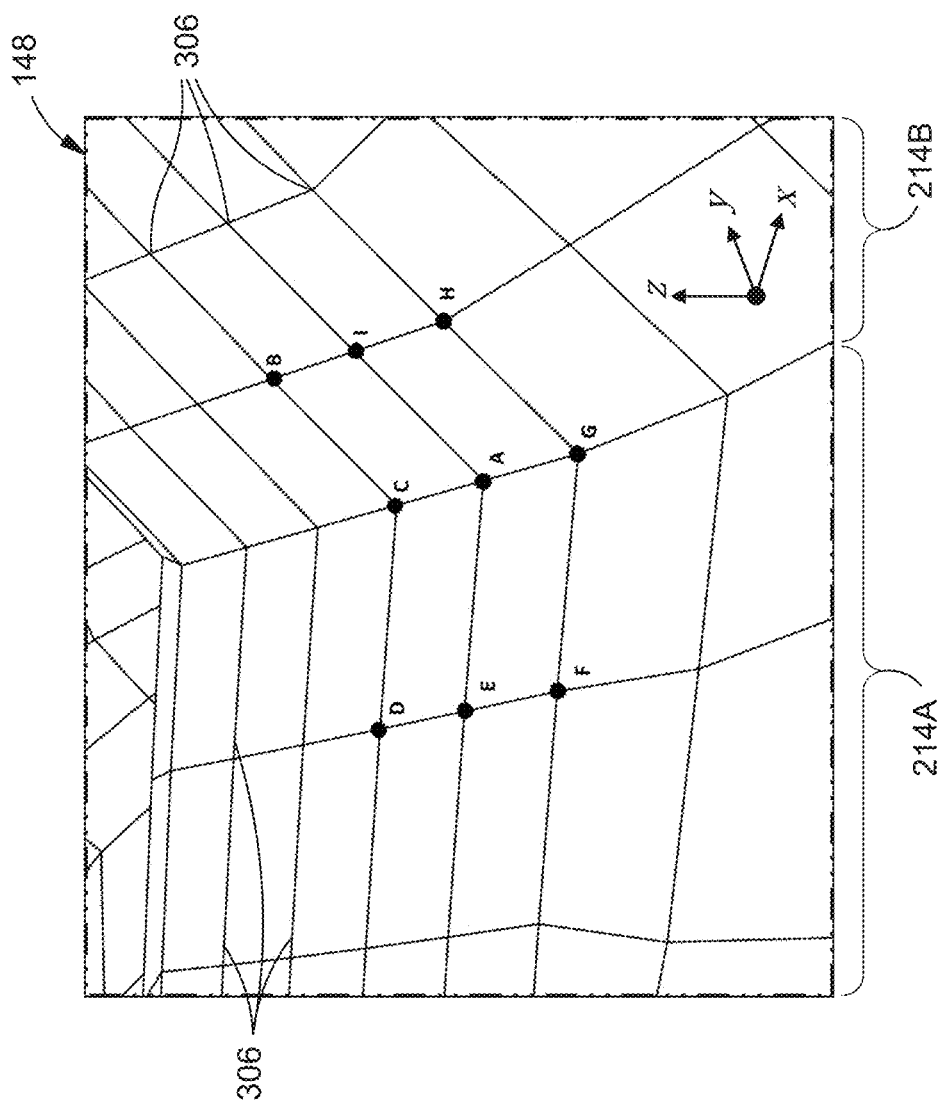
FIG. 22 is a magnified view of the portion of the stitched mesh identified by reference numeral 22 of FIG. 21.

Referring to FIGS. 20-24, step 710 of the method 700 comprises performing one or more smoothing operations on the stitched mesh 148 (FIGS. 20-22), to result in a smoothed mesh 150 (FIGS. 23-24). The smoothing operations can be Laplace smoothing operations, Laplace-Beltrami smoothing operations, volume-constrained Laplace smoothing, Taubin smoothing or other types of smoothing operations. In one example, the application of Laplace smoothing on a cell mesh node of interest involves computing a new position of the cell mesh node of interest, by taking a weighted average of the positions of all of its neighbour nodes. FIG. 22 is a magnified view of the portion of the stitched mesh 148 identified by reference numeral 22 of FIG. 21, illustrating the juncture of 2 cell branches 214A, 214B of the stitched mesh 148. In the example shown, a new position of node of interest A is computed by taking the weighted average of the positions of all of its neighbour nodes using the following equations:

$$A_x = \frac{\sum_{i=1}^{k} w_i p_{i_x}}{\sum_{i=1}^{k} w_i} \quad \text{(Equation 650)}$$

$$A_y = \frac{\sum_{i=1}^{k} w_i p_{i_y}}{\sum_{i=1}^{k} w_i} \quad \text{(Equation 652)}$$

-continued $$A_z = \frac{\sum_{i=1}^{k} w_i p_{i_z}}{\sum_{i=1}^{k} w_i}$$ (Equation 654)

wherein $A_x$, $A_y$, and $A_z$, are respectively the x, y, and z components of the updated position of cell mesh node A. $p_{i_x}, p_{i_y}$ and $p_{i_z}$ are respectively the x, y, and z components of the position of the $i^{th}$ neighbour node (e.g., one of node B, C, D, E, F, G, H or I in this specific example). $w_i$ denotes the weight associated with the $i^{th}$ neighbour node, and k is the total number of neighbouring nodes (i.e., k=8 in this example). In at least one example, all values for the weights are equal to 1.0, thereby providing an unweighted average sum. In another example, the weights are inversely proportional to the distance between cell mesh node A and the $i^{th}$ neighbour node. In yet another example, the weights are inversely proportional to the square of the distance between cell mesh node A and the $i^{th}$ neighbour node.

To apply Laplace smoothing to the entire stitched mesh 148, the above-described operation is performed for every cell mesh node 306, considering its unique set of neighbour nodes. This process is then repeated a number of times, each time using the new mesh generated by the Laplace smoothing operation. Typically one hundred iterations of Laplace smoothing are applied, although the number of smoothing operations may be as low as one, or as high as one thousand or more.

FIGS. 23-24 show an example of a smoothed mesh 150, generated by iteratively performing a plurality of smoothing operations on the stitched mesh 148 of FIG. 20. In this specific example, one hundred iterations of an unweighted Laplace smoothing operation were applied to the stitched mesh 148. As a result of the smoothing operations, the juncture between the cell branches 214 is a gently curved transition 156, with no notches, steps, or sharp corners, as shown in FIG. 24. Similarly, each interface 110 between the cell branches 214 and the skin mesh (not shown) of a smoothed mesh 150 has a generally curved shape. Advantageously, the smoothing operations may reduce the occurrence of stress concentrations in the additively manufactured body 120 (FIG. 25).

Referring to FIG. 25, shown is an example of a body digital representation 312 of a three-dimensional body 120 having the infill geometry 152 generated using the above-described methods. In addition to the infill geometry 152, the body digital representation 312 includes the skin geometry of the outer skin 102. In one or more examples, the outer skin 102 of the body digital representation 312 is constructed by extruding the skin geometry, which is represented by the outermost triangular faces 204 (FIG. 6) of the tetrahedral elements 134 (FIG. 6) of the driver mesh 132 (FIG. 6) in a direction normal to the outer skin 102. In other examples, the outer skin 102 of the body digital representation 312 is constructed by meshing the trimmed parametric surfaces (not shown) associated with the outer skin 102 of the driver digital model 122 to thereby generate an outer skin mesh (not shown), and extruding the elements contained within the outer skin mesh in a direction normal to the outer skin 102. A boolean operation may optionally be applied in order to combine the outer skin mesh and the infill mesh together in an additive manner.

In the physical version, the body 120 includes at least some portion of outer skin 102 and the infill structure 154. The infill structure 154 and the outer skin 102 are formed of polymeric, ceramic, and/or metallic material, depending upon the material composition of the powder 410 (FIG. 26) that is used for additively manufacturing the body 120. The outer skin 102 at least partially encloses the infill structure 154. In the example shown, the outer skin 102 is non-planar, and is doubly curved with principal curvatures which are equal (i.e., spherical, in this example). However, in other examples not shown, a body 120 can have an outer skin 102 that is doubly curved with principal curvatures that are not equal in at least one region of the body 120 (e.g. an ellipsoid, a saddle shape). In other examples, a body 120 can have an outer skin 102 that has only one non-zero principal curvature in at least one region of the body 120 (e.g., a cone or a cylindrically-shaped body). In further examples, a body 120 can have an outer skin 102 that contains no curvature (i.e., is planar) in at least one region of the body 120.

As shown in FIG. 25, the infill structure 154 is comprised of a plurality of unit cell structures 206. As mentioned above, each unit cell structure 206 may have 4 cell branches 214, and each unit cell structure 206 is configured to fit exactly within a tetrahedral element 134 having triangular faces 204. Each unit cell structure 206 is symmetric with respect to the arrangement of the cell mesh nodes 306 on the triangular faces 204, allowing the unit cell structures 206 to be connected to each other to form a tree-like lattice extending throughout the body 120. As a result of the above-described smoothing operations, the infill structure 154 has smooth (i.e., gradually curved) transitions 156 at the connections between the unit cell structures 206, which facilitates the smooth distribution of stress throughout the body 120, and may reduce or minimize stress concentrations.

The unit cell structures 206 may be arranged in accordance with a three-dimensional Delaunay triangulation of the body 120, as described above. Although not shown in FIG. 25, in some examples, the density of the unit cell structures 206 is spatially graded over at least one region of the body 120 (e.g., FIGS. 31, 32, 35, 38, 46), as described in greater detail below. The outermost layer of unit cell structures 206 is connected to the outer skin 102. As mentioned above, all interfaces 110 between the unit cell structures 206 and the outer skin 102 have the same topology (i.e., the same general shape). In this regard, all of the interface 110 connections are diffeomorphic to each other, and are diffeomorphic to the set $S^1$. The consistent topology at the interfaces 110 may reduce or minimize stress concentrations at the interfaces 110. In this regard, a reduction of stress at these interface 110 locations may improve the fatigue life of the additively manufactured body 120.

Figure 26:
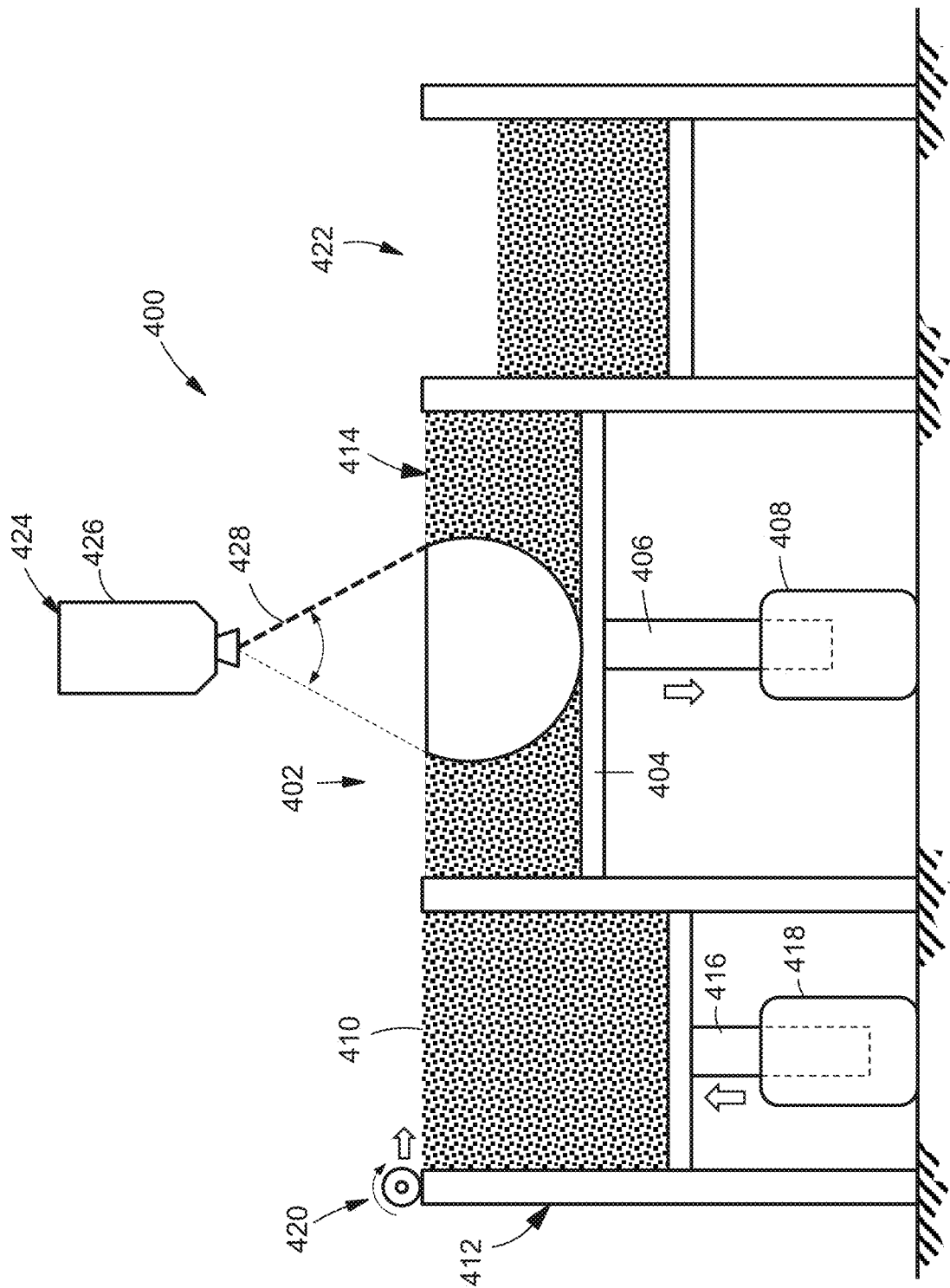
FIG. 26 is a side view of an example of an additive manufacturing apparatus for manufacturing a three-dimensional body having an infill geometry generated using the presently-disclosed system and method.
Figure 39:
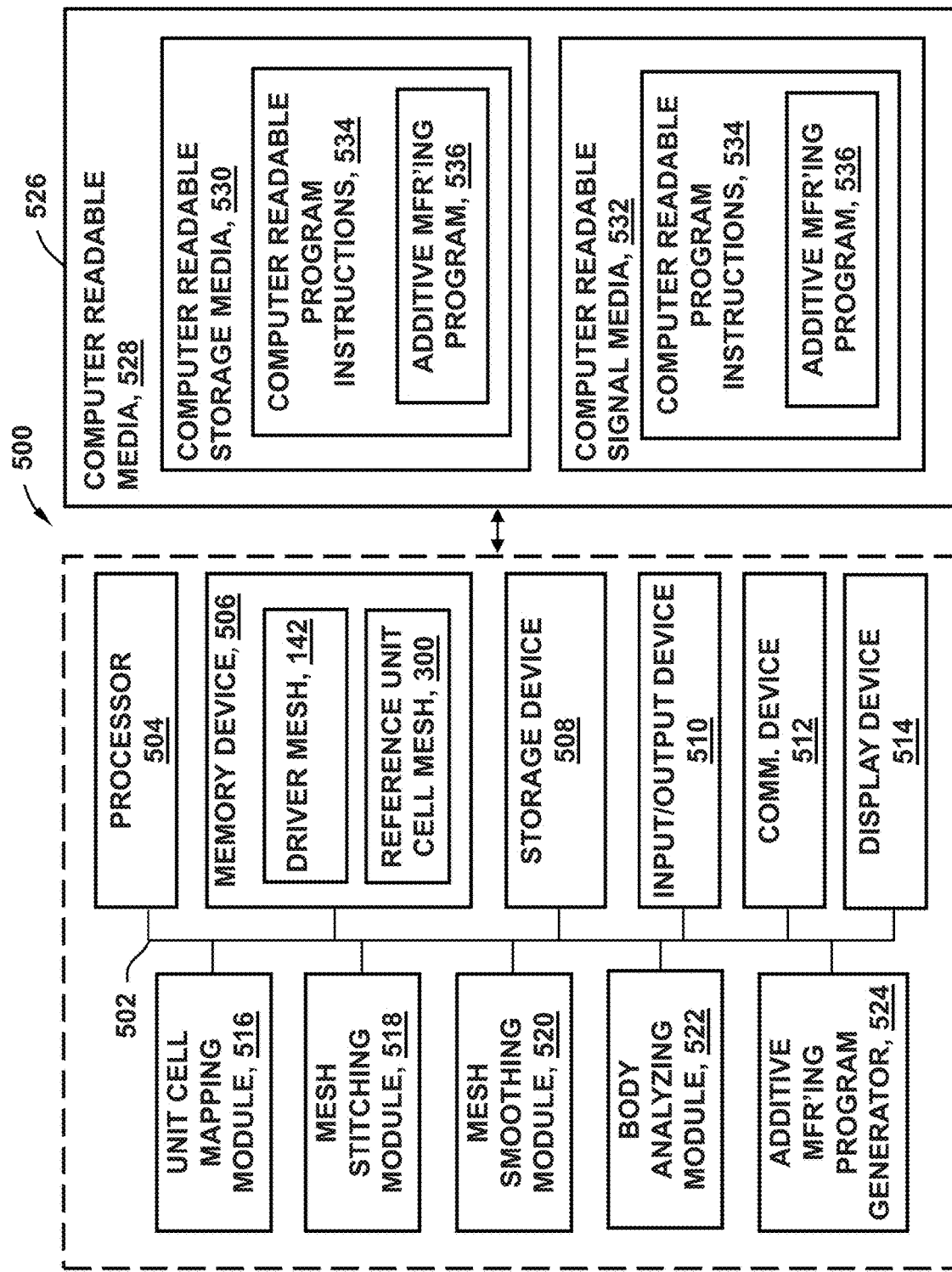
FIG. 39 is a block diagram of an example of a processor-based system for performing the operations of the presently-disclosed method for generating an infill geometry of a three-dimensional body.

Referring to FIGS. 25-26, the method 700 in some examples includes using the digital representation of the body 120 to develop an additive manufacturing program 536 (e.g., a software program—see FIG. 39). The additive manufacturing program 536 can be used by an additive manufacturing apparatus 400 to manufacture the three-dimensional body 120. FIG. 26 shows an example of an additive manufacturing apparatus 400 for manufacturing the body 120 of FIG. 25.

In the example of FIG. 26, the additive manufacturing apparatus 400 is configured as a powder bed fusion machine that uses selective laser melting for additive manufacturing. The additive manufacturing apparatus 400 includes a powder supply chamber 412 containing a powder 410. The powder 410 may be a polymeric powder, a ceramic powder, a metal powder, or any combination thereof. The powder supply chamber 412 is supported is vertically movable via a powder supply piston 416, which is actuated by a powder supply actuator 418.

The additive manufacturing apparatus 400 includes a powder leveling apparatus 420 (e.g., a roller) and a build chamber 402. The build chamber 402 includes a build platform 404 that supports a powder bed 414. The build platform 404 is vertically movable in a stepwise manner via a build platform piston 406, which is actuated by a build platform actuator 408. The additive manufacturing apparatus 400 further includes an energy source 424 or heat source, such as a laser device 426 configured to emit a laser beam 428. During additive manufacturing of the body 120, the powder leveling apparatus 420 periodically moves across the powder 410 contained within the powder supply chamber 412 and onto the powder bed 414, to thereby transfer a thin layer of powder 410 onto the powder bed 414. Excess powder 410 falls into the powder overflow chamber 422.

The laser beam 428 is moved in a manner to form the cross-sectional shape of a slice (not shown) of the body digital representation 312 (FIG. 25) of the body 120. The laser beam 428 melts and fuses the powder 410 particles into a solid layer in the shape of the slice. The build platform 404 is moved incrementally downwardly, via the build platform piston 406, after which the powder leveling apparatus 420 distributes a new layer of powder 410 over the most recently formed solid layer in the powder bed 414 of the build chamber 402. The process is repeated layer by layer until the manufacturing of the body 120 is complete. Although the additive manufacturing apparatus 400 is shown and described as a selective laser melting system, any one of a variety of alternative types of additive manufacturing technologies (e.g., electron beam melting, direct energy deposition, supersonic particle deposition, binder jetting, etc.) may be implemented for manufacturing three-dimensional bodies 120 using the presently-disclosed method.

Figure 27:
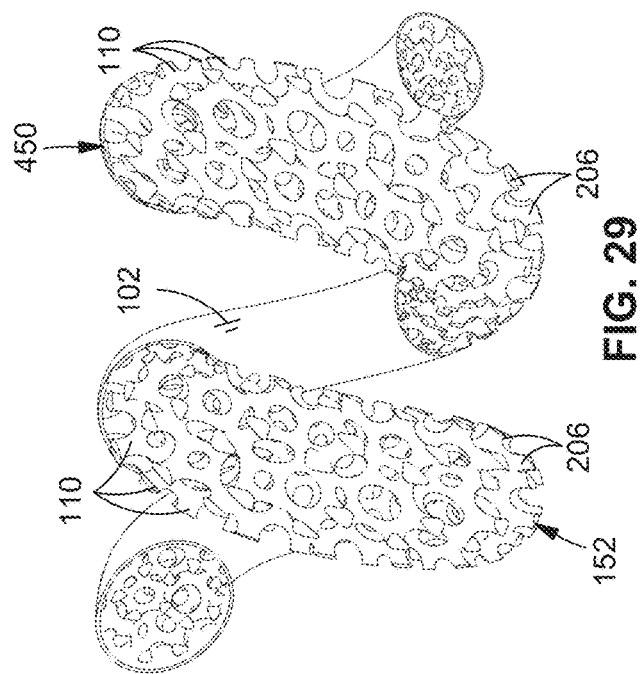
FIG. 27 is a perspective view of an example of a driver digital model of a helical body.
Figure 28:
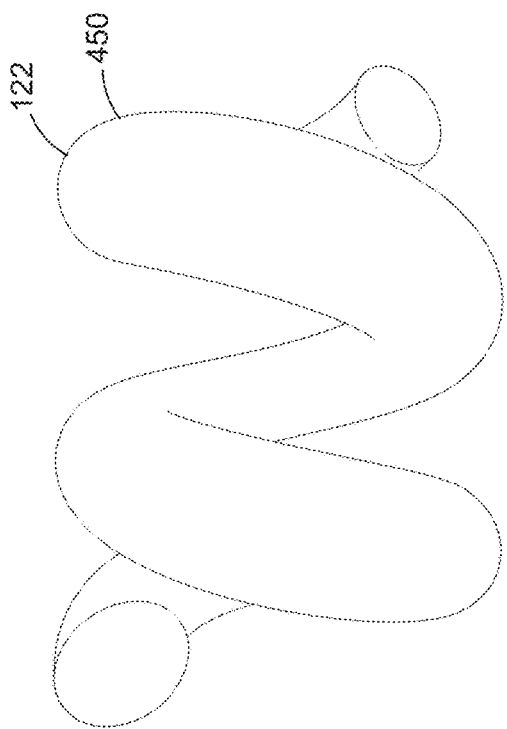
FIG. 28 is a perspective view of an example of a driver mesh generated by meshing the driver digital model of FIG. 27.
Figure 29:
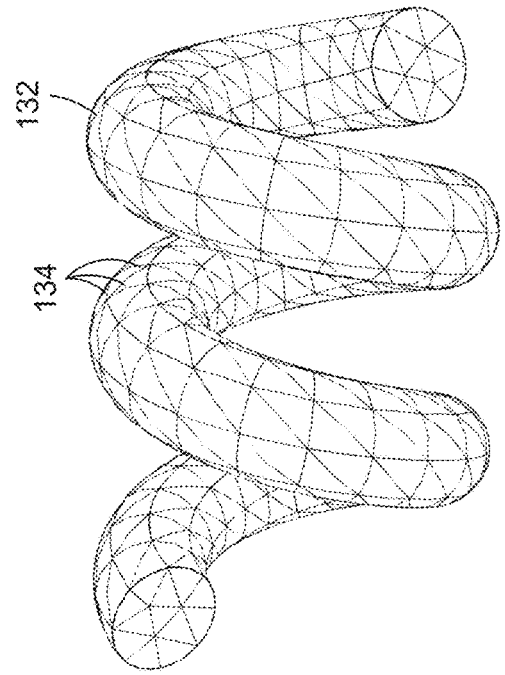
FIG. 29 is a perspective view of an additively manufacturable version of the helical body of FIG. 27, with the outer skin partially removed to reveal an infill geometry generated by mapping a reference unit cell mesh onto the driver mesh of FIG. 28.

Referring to FIGS. 27-38, shown are several examples of different configurations of bodies 120 for which an infill geometry 152 can be generated using the presently disclosed system and method. FIG. 27 shows an example of a driver digital model 122 (i.e., a CAD model) of a helical body 450. FIG. 28 shows an example of a driver mesh 132 generated by meshing the driver digital model 122 using the above-described method 700. As mentioned above, the driver mesh 132 is comprised of tetrahedral elements 134. FIG. 29 shows an additively manufacturable version of the helical body 450 of FIG. 27, with the outer skin 102 partially removed to reveal an infill geometry 152 generated by mapping a reference unit cell mesh 300 onto the driver mesh 132 of FIG. 28. The unit cell structures 206 of the infill geometry 152 are connected to each other due to the symmetries of the reference unit cell meshes 300. The method results in a consistent topology at the interfaces 110 between the infill structure 154 and the outer skin 102 of the helical body 450.

FIG. 30 shows an example of a driver mesh 132 of a cylindrical body 452. The density of the driver mesh nodes 140 is spatially graded. More specifically, the left-hand side of the driver mesh 132 has an increased node density relative to the right-hand side. As a result, the driver mesh 132 has a corresponding reduction in the size of the tetrahedral elements 134 on the left-hand side, relative to the size of the tetrahedral elements 134 on the right-hand side. FIGS. 31-32 show the infill geometry 152 generated by mapping a reference unit cell mesh 300 (FIG. 12) onto the driver mesh 132 of FIG. 30. As a result of the spatial grading of the driver mesh 132, the left-hand side of the infill geometry 152 has a higher density of unit cell structures 206 than the right hand side. The increased density of the unit cell structures 206 on the left-hand side may be desirable if the left-hand side is subjected to high stresses. As may be appreciated, the node density of a driver mesh 132 may be locally adjusted (e.g., increased or decreased) based on any one of a variety of physical quantities (e.g., stress, heat, electrical current, etc.) to which the body 120 may be subjected.

FIG. 33 shows an example of a driver digital model 122 of a rectangular body 454 having a through-hole. FIG. 34 shows an example of a driver mesh 132 generated by meshing the driver digital model 122 of FIG. 33. The driver mesh 132 is spatially graded in a manner such that the density of the tetrahedral elements 134 is higher around the through-hole than in other areas of the rectangular body 454. FIG. 35 shows an example of an additively manufacturable version of the rectangular body 454, with the outer skin 102 partially cutaway to illustrate the higher density of unit cell structures 206 around the through-hole as a result of the spatial grading of the driver mesh 132. As mentioned above, spatial grading provides a means for creating a body 120 having an improved strength-to-weight ratio, while still maintaining consistent interfaces 110 between the infill structure 154 and the outer skin 102.

Figure 36:
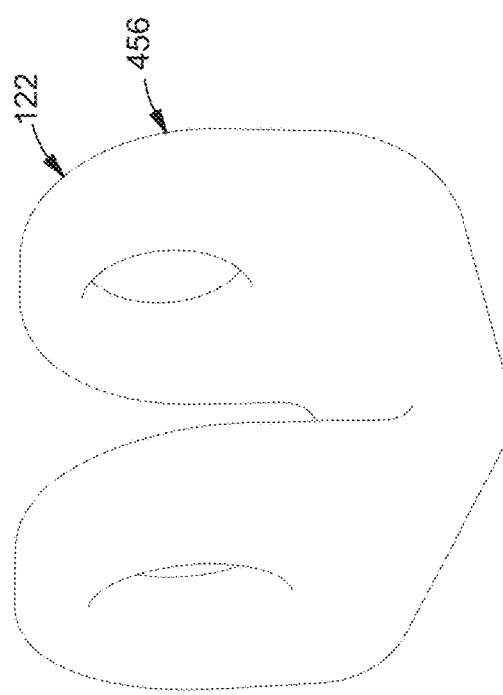
FIG. 36 is a perspective view of an example of a driver digital model of a clevis bracket having through-holes.
Figure 37:
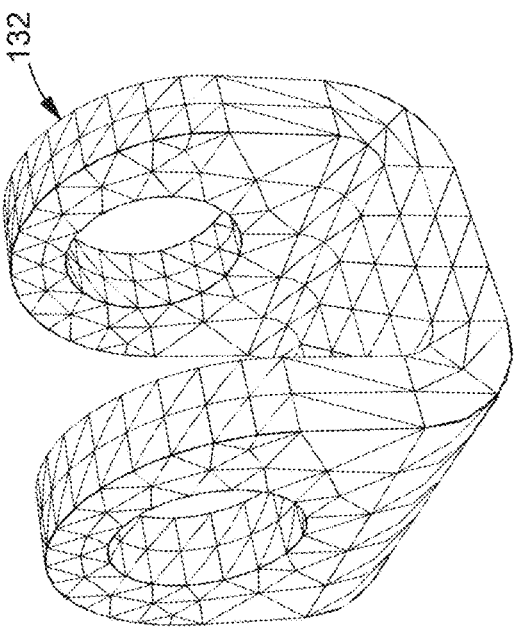
FIG. 37 is a perspective view of an example of a driver mesh generated by meshing the driver digital model of FIG. 36, and illustrating the spatial grading of the driver mesh around the through-holes.
Figure 38:
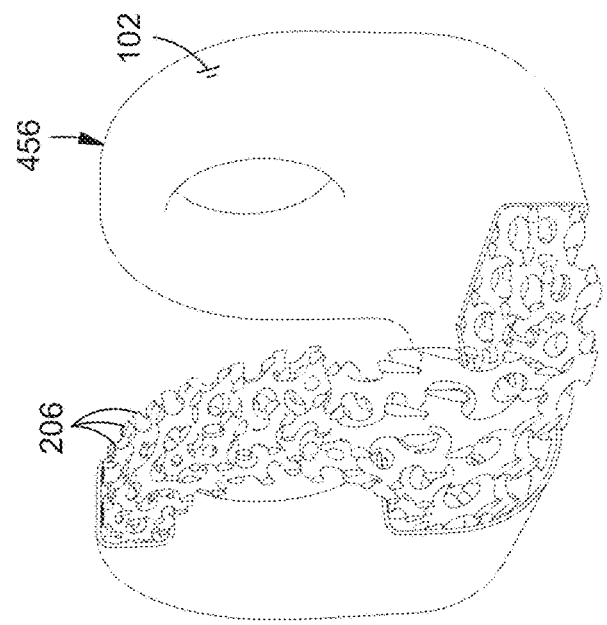
FIG. 38 is a perspective view of an additively manufacturable version of the clevis bracket of FIG. 36, with the outer skin partially removed to reveal an infill geometry generated by mapping a reference unit cell mesh onto the driver mesh of FIG. 37.

FIG. 36 shows an example of a driver digital model 122 of a clevis bracket 456 having through-holes. FIG. 37 shows an example of a driver mesh 132 generated by meshing the driver digital model 122 of FIG. 36, and illustrates the spatial grading of the driver mesh 132 around the through-holes. FIG. 38 shows an example of an additively manufacturable version of the clevis bracket 456 of FIG. 36, where the outer skin 102 has been partially removed to illustrate the higher density of unit cell structures 206 around the through-holes as a result of the spatial grading of the driver mesh 132 of FIG. 37.

Referring now to FIG. 39, the above-described methods 700 and 800, in whole or in part, may be performed in a computer-implemented process, such as on a processor-based system or other suitable computer system. The processor-based system 500 is configured to perform computer readable program instructions 534. The computer readable program instructions 534 are provided to, or are loaded onto, the processor-based system 500 in order to implement the above-described operations or steps of methods 700 and 800. In a non-limiting example, the processor-based system 500 and/or the computer readable program instructions 534 generate an infill geometry 152 for a three-dimensional body 120.

The block diagram of FIG. 39 illustrates the processor-based system 500 in an advantageous example for generating an infill geometry 152 for a body 120. The processor-based system 500 includes a data communication path 502 (e.g., a data link) to communicatively couple one or more components, to facilitate transfer of data between such components. The communication path 502 comprises one or more data buses, or any other suitable communication path 502 that facilitates the transfer of data between the components and devices of the processor-based system 500. In a non-limiting example, the components include one or more of a processor 504, a memory device 506, a storage device 508, a communications device 512, an input/output device 510, a display device 514, a unit cell mapping module 516, a mesh stitching module 518, a mesh smoothing module 520, a body analyzing module 522, and an additive manufacturing program generator 524.

The memory device 506 is configured to store one or more driver meshes 132, each representing a solid version of the body 120. As described above, each driver mesh 132 is comprised of a plurality of tetrahedral elements 134. The tetrahedral elements 134 are linear tetrahedral elements 136, or quadratic tetrahedral elements 138, as described above. In some examples, at least one driver mesh 132 is spatially graded over at least one region of the body 120, to either refine or coarsen the driver mesh 132 in such regions.

In addition to storing one or more driver meshes 132, the memory device 506 is configured to store one or more reference unit cell meshes 300, each having a different unit cell geometry 212, and each configured to fit exactly within a regular tetrahedron 202, as described above. Each reference unit cell mesh 300 is symmetric with respect to the arrangement of cell mesh nodes 306 on the triangular faces 204 of the regular tetrahedron 202. The symmetric nature of a reference unit cell mesh 300 enables adjacent mapped unit cell meshes 302 to be connected (i.e., stitched) to each other, to thereby result in a continuous stitched mesh 148.

Referring still to FIG. 39, the processor-based system 500 includes a unit cell mapping module 516 configured to map a plurality of the reference unit cell meshes 300 respectively onto a plurality of tetrahedral elements 134 of the driver mesh 132. The unit cell mapping module 516 performs the above-described mapping operation by mapping unit cell mesh 300 in accordance with the basis functions defined on the plurality of tetrahedral elements 134 in a manner causing adjustment of the size and shape of the plurality of reference unit cell meshes 300 to fit respectively within the plurality of tetrahedral elements 134, and resulting in an infill geometry 152 comprising a plurality of mapped unit cell meshes 302 connected to each other. The unit cell mapping module 516 maps the reference unit cell meshes 300 onto a driver mesh 132 using either linear basis functions or quadratic basis functions, depending on whether the driver mesh 132 is made up of linear tetrahedral elements 136 or quadratic tetrahedral elements 138, as described above.

Figure 40:
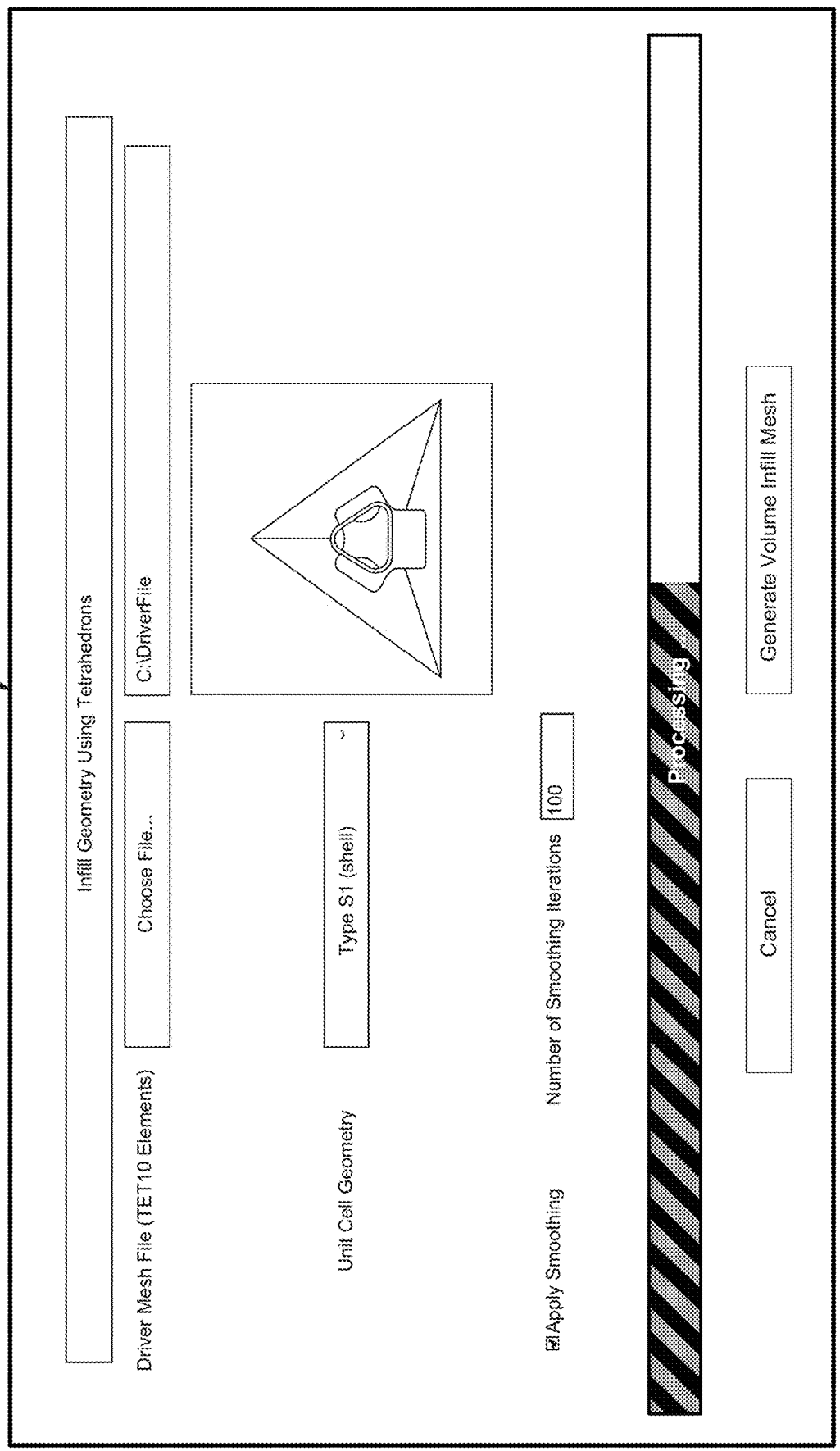
FIG. 40 shows an example of a user interface for the processor-based system of FIG. 39.

FIG. 40 shows a non-limiting example of a user interface 538 of the processor-based system 500. In the example shown, the user interface 538 provides the ability to select a driver mesh 132 ("Driver mesh File") from among a plurality of different types of driver meshes 132 stored in the memory device 506, with each driver mesh 132 representing a different body configuration (i.e. of different perimeter size, different shape, different spatial grading, and/or different contour, etc.). In addition to selecting the driver mesh 132, the user interface 538 provides the ability to select a unit cell geometry 212 ("Cell Geometry") from among a plurality of different configurations of unit cell geometries 212 stored in the memory device 506. The user interface 538 also provides the ability to select whether smoothing operations ("Apply Smoothing") are to be applied to the stitched mesh 148, and the quantity of smoothing iterations ("Number of Smoothing Iterations") to be performed.

Referring back to FIG. 39, the processor-based system 500 includes a mesh stitching module 518 configured to merge coincident cell mesh nodes 306 of the tetrahedral elements 134, to result in a stitched mesh 148 as described above with regard to step 708. As mentioned above, after mapping is completed, each mapped unit cell mesh 302 conforms to the shape of one of the tetrahedral elements 134 of the driver mesh 132, and the adjacent mapped unit cell meshes 302 are stitched together to form a continuous stitched mesh 148. The processor-based system also includes a mesh smoothing module 520 configured to perform one or more smoothing operations on the stitched mesh 148, to result in a smoothed mesh 150. As described above with regard to step 710, the smoothing operations can be Laplace smoothing operations, Laplace-Beltrami smoothing operations, volume-constrained Laplace smoothing, Taubin smoothing, or other types of smoothing operations.

After making the above-described selections, a user selects "Generate Volume Infill Mesh" on the user interface 538, causing the processor-based system 500 to generate a smoothed mesh 150 having an infill geometry 152 connected to an outer skin 102. The user interface 538 includes a progress bar above the "Cancel" and "Generate Volume Infill Mesh" buttons. The processor-based system 500 is configured to convert the smoothed mesh 150 into a body digital representation 312 of the body 120. The additive manufacturing program generator 524 (FIG. 39) is configured to use the body digital representation 312 of the body 120 to generate an additive manufacturing program 536 (i.e., a software program). The additive manufacturing program 536 is outputted to an additive manufacturing apparatus 400 (e.g., FIG. 26) configured to manufacture a physical version of the body 120, as described above.

Referring still to FIG. 39, in some examples, the processor-based system 500 includes a body analyzing module 522 configured to perform a numerical analysis on the stitched mesh 148, or smoothed mesh 150 if selected. The numerical analysis involves determining the distribution of a physical quantity (e.g., displacement, strain, pressure, temperature, etc.) across the stitched mesh 148 or smoothed mesh 150 in response to the application of a given combination of loads (e.g., mechanical load, thermal load, etc.), constraints (e.g., fixed or pinned), and material properties (e.g., mechanical properties, thermal properties, etc.). In one example, the numerical analysis performed by the body analyzing module 522 is a finite element analysis and numerical simulation, such as simulating the stress and deflection of the body 120 when subjected to a mechanical load.

Figure 42:
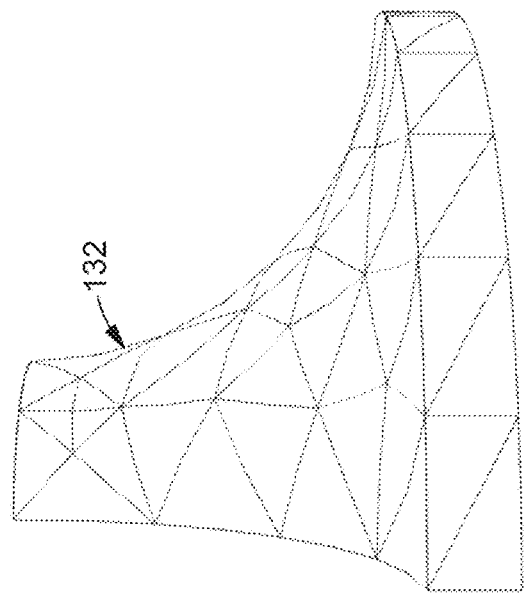
FIG. 42 is a perspective view of an example of a driver mesh generated by meshing the driver digital model of FIG. 41.
Figure 43:
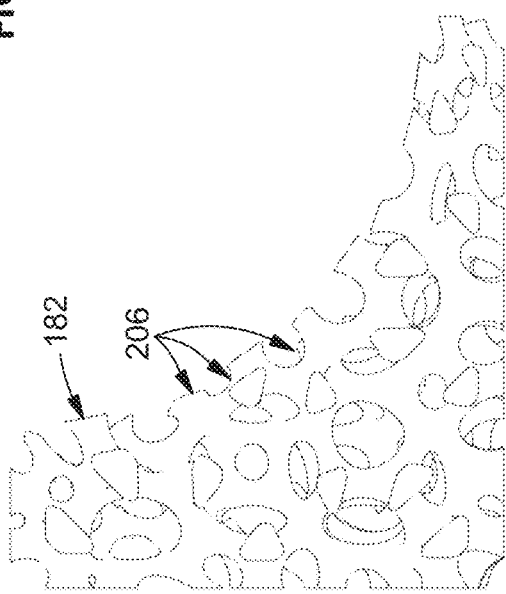
FIG. 43 is a side view of an infill geometry generated by mapping a reference unit cell mesh onto the driver mesh of FIG. 42.
Figure 41:
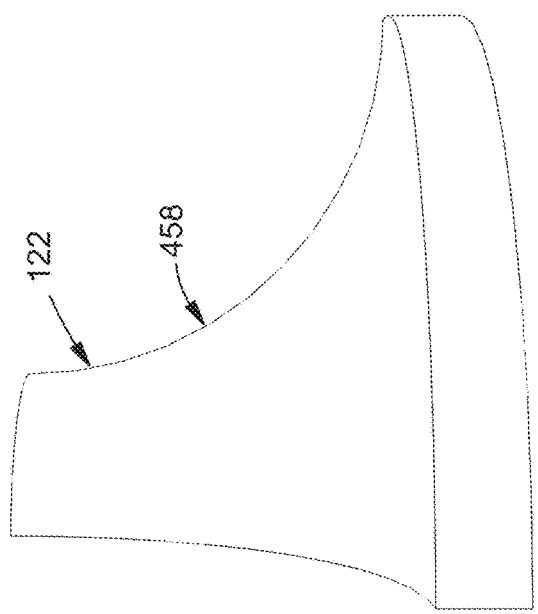
FIG. 41 is a perspective view of an example of a driver digital model of a quarter-round body.
Figure 45:
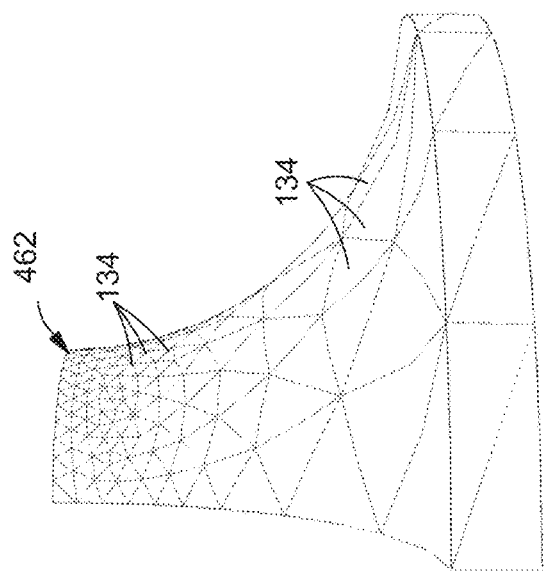
FIG. 45 is a perspective view of a refined mesh that is spatially graded in correspondence with the von Mises stress distribution of FIG. 44.

Referring to FIGS. 41-46, in some examples, the body analyzing module 522 is configured to refine the driver mesh 132 into a refined driver mesh 462 having a density that is spatially graded in correspondence with the distribution of a scalar quantity (or the gradient of the scalar quantity) across it. For example, FIG. 41 shows an example of a driver digital model 122 of a quarter-round body 458. FIG. 42 shows a driver mesh 132 resulting from the meshing of the driver digital model 122 of FIG. 41. In the example shown, the node density is uniform throughout the driver mesh 132. FIG. 43 shows an infill geometry 152 generated by mapping a reference unit cell mesh 300 (FIG. 12) onto the driver mesh 132 of FIG. 42. As a result of the approximately uniform distribution of driver mesh nodes 140 in the driver mesh 132, the unit cell structures 206 of the infill geometry 152 are also approximately uniform in size.

Figure 46:
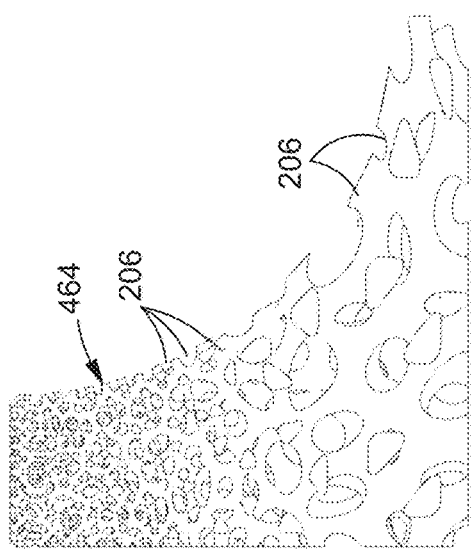
FIG. 46 is a side view of the infill geometry of the body, generated by mapping a reference unit cell mesh onto the refined mesh of FIG. 45.
Figure 44:
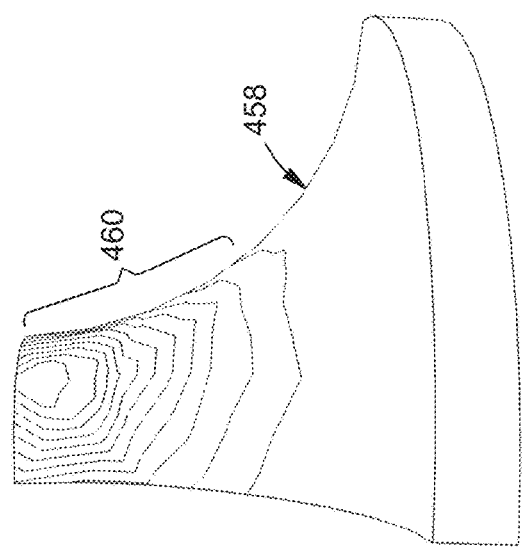
FIG. 44 is a perspective view of the quarter-round body of FIG. 41, showing the distribution of von Mises stress across the body in response to the application of a mechanical load and constraint on the quarter-round body.

FIG. 44 shows contours of von Mises stress across the quarter-round body 458 in response to the application of a mechanical load and a constraint on the quarter-round body 458. As can be seen, the upper portion of the quarter-round body 458 exhibits a stress concentration 460. As a result, the body analyzing module 522 generates a refined driver mesh 462 in which the tetrahedral elements 134 are spatially graded in correspondence with the von Mises stress distribution of FIG. 44. The unit cell mapping module 516 of the processor-based system is configured to use the refined driver mesh 462 to map a plurality of reference unit cell meshes 300 (FIG. 11) respectively onto the plurality of tetrahedral elements 134 of the refined driver mesh 462 through the use of basis functions. FIG. 46 shows a refined infill geometry 464 resulting from mapping onto the refined driver mesh 462 of FIG. 45. As shown in FIG. 46, the unit cell structures 206 of the refined infill geometry 464 are spatially graded in correspondence with the von Mises stress distribution.

Referring again to FIG. 39, the display device 514 is optionally configured to graphically display any one of the driver meshes 132 and/or reference unit cell meshes 300 stored in the memory device 506. In addition, the display device 514 is optionally configured to graphically display the stitched mesh 148 or smoothed mesh 150 resulting from mapping a reference unit cell mesh 300 onto a driver mesh 132. The display device 514 receives the above-noted data from one or more of the corresponding components of the processor-based system 500 via the communication path 502.

The processor-based system 500 includes the processor 504 for executing instructions of computer readable program instructions 534 installed into the memory device 506. Alternatively, the processor-based system 500 comprises a multi-processor core having two or more integrated processor cores. Even further, the processor 504 may comprise a main processor and one or more secondary processors integrated on a chip. The processor 504 may also comprise a multi-processor system having a plurality of similarly configured processors.

Referring still to FIG. 39, the processor-based system 500 includes the memory device 506, which may comprise one or more volatile or non-volatile storage devices 508. However, the memory device 506 can comprise any hardware device for storing data. For example, the memory device 506 can comprise a random access memory or a cache of an interface and/or integrated memory controller hub included in the communication path 502. The memory device 506 can permanently and/or temporarily store any one of a variety of different types of data, computer readable code or program instructions, or any other type of information. The storage device 508 can be provided in a variety of configurations including, but not limited to, a flash memory device, a hard drive, an optical disk, a hard disk, a magnetic tape or any other suitable example for long-term storage. In addition, the storage device 508 can comprise a removable device such as a removable hard drive.

The processor-based system 500 can additionally include one or more of the input/output devices 510 to facilitate the transfer of data between components connected to the processor-based system 500. An input/output device 510 can be directly and/or indirectly coupled to the processor-based system 500. The input/output device 510 facilitates user-input by means of a peripheral device such as a keyboard, a mouse, a joystick, a touch screen, and any other suitable device for inputting data to the processor-based system 500. The input/output device 510 can further include an output device for transferring data representative of the output of the processor-based system 500. For example the input/output device 510 can comprise a display device 514 such as a computer monitor or computer screen for displaying results of data processed by the processor-based system 500. The input/output device 510 can optionally include a printer or fax machine for printing a hardcopy of information processed by the processor-based system 500. FIG. 40 shows an example of an input/output device 510, in the form of the above-described user interface 538.

Referring still to FIG. 39, the processor-based system 500 can include one or more communications devices 512 to facilitate communication of the processor-based system 500 within a computer network and/or with other processor-based systems. Communication of the processor-based system 500 with a computer network or with other processor-based systems can be by wireless means and/or by hardwire connection. For example, the communications device 512 can comprise a network interface controller to enable wireless or cable communication between the processor-based system 500 and a computer network. The communications device 512 can also comprise a modem and/or a network adapter, or any one of a variety of alternative devices for transmitting and receiving data.

One or more of the operations of the above-described methods 700, 800 are performed by the processor 504 and/or by one or more of the unit cell mapping module 516, the mesh stitching module 518, the mesh smoothing module 520, the body analyzing module 522, and the additive manufacturing program generator 524, using the computer readable program instructions 534. The computer readable program instructions 534 can comprise program code, which can include computer usable program code and computer readable program code. The computer readable program instructions 534 are read and executed by the processor 504. The computer readable program instructions 534 enable the processor 504 to perform one or more operations of the above-described examples associated with generating the infill geometry 152 of a body 120.

Referring still to FIG. 39, the computer readable program instructions 534 include operating instructions for the processor-based system 500, and further include applications and programs. The computer readable program instructions 534 can be contained within and/or loaded onto one or more of a memory device 506 and/or a storage device 508 for execution by the processor 504 and/or by the unit cell mapping module 516, the mesh stitching module 518, the mesh smoothing module 520, the body analyzing module 522, and/or the additive manufacturing program generator 524. As indicated above, the memory device 506 and/or storage device 508 can be communicatively coupled to one or more of the remaining components illustrated in FIG. 39 through the communication path 502.

The computer readable program instructions 534 can be contained on tangible or non-tangible, transitory or non-transitory computer readable media 528 and which can be loaded onto or transferred to the processor-based system 500 for execution by the processor 504. The computer readable program instructions 534 and the computer readable media 528 comprise a computer program product 526. In an example, the computer readable media 528 can comprise computer readable storage media 530 and/or computer readable signal media 532.

The computer readable storage media 530 can comprise a variety of different examples including, but not limited to, optical disks and magnetic disks that may be loaded into a drive, a flash memory device, or other storage device or hardware for transfer of data onto a storage device such as a hard drive. The computer readable storage media 530 can be non-removably installed on the processor-based system 500. The computer readable storage media 530 can comprise any suitable storage media including, without limitation, a semiconductor system or a propagation medium. In this regard, the computer readable storage media 530 can comprise electronic media, magnetic media, optical media, electromagnetic media, and infrared media. For example, the computer readable storage media 530 can comprise magnetic tape, a computer diskette, random access memory, and read-only memory. Non-limiting examples of optical disks include compact disks-read only memory, compact disks-read/write, and digital video disks/digital versatile disks.

The computer readable signal media 532 can contain the computer readable program instructions 534, and can be embodied in a variety of data signal configurations including, but not limited to, an electromagnetic signal and an optical signal. Such data signals can be transmitted by any suitable communications link including by wireless or hardwire means. For example, the hardwire means may comprise an optical fiber cable, a coaxial cable, a signal wire, and any other suitable means for transmitting the data by wireless or by physical means.

Referring still to FIG. 39, the computer readable signal media 532 can facilitate the downloading of the computer readable program instructions 534 to the non-volatile storage or other suitable storage or memory device 506 for use within processor-based system 500. For example, the computer readable program instructions 534 contained within the computer readable storage media 530 can be downloaded to the processor-based system 500 over a computer network from a server or a client computer of another system.

Any one of a variety of different examples of the processor-based system 500 can be implemented using any hardware device or system capable of executing the computer readable program instructions 534. For example, the processor 504 can comprise a hardware unit configured for performing one or more particular functions wherein the computer readable program instructions 534 for performing the functions are pre-loaded into the memory device 506.

In an example, the processor 504 can comprise an application specific integrated circuit, a programmable logic device, or any other hardware device configured to perform one or more specific functions or operations. For example, a programmable logic device may be temporarily or permanently programmed to perform one or more of the operations related to generating the infill geometry 152 of a body 120. The programmable logic device can comprise a programmable logic array, programmable array logic, a field programmable logic array, and a field programmable gate array and any other suitable logic device, without limitation. In an example, the computer readable program instructions 534 can be operated by the processor 504 and/or by other devices, including one or more hardware units in communication with the processor 504. Certain portions of the computer readable program instructions 534 can be executed by the one or more hardware units.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of generating an infill geometry of a body, comprising:
   accessing, through a user interface of a computer, a driver mesh file stored in a memory device of the computer, the driver mesh file comprising a three-dimensional driver mesh representing a solid version of the body, and the three-dimensional driver mesh is comprised of a plurality of three-dimensional tetrahedral elements;
   accessing, through the user interface, a unit cell geometry file stored in the memory device, the unit cell geometry file comprising a three-dimensional reference unit cell mesh configured to fit exactly within a three-dimensional regular tetrahedron having triangular faces, and the three-dimensional reference unit cell mesh is made up of a plurality of cell mesh elements and associated cell mesh nodes, and the three-dimensional reference unit cell mesh is symmetric with respect to the arrangement of the cell mesh nodes on the triangular faces;
   causing a processor of the computer to perform the following, in response to a command received through the user interface:
      mapping the cell mesh nodes of a plurality of the three-dimensional reference unit cell meshes respectively into the plurality of three-dimensional tetrahedral elements of the three-dimensional driver mesh, through the use of basis functions defined on each of the plurality of three-dimensional tetrahedral elements in a manner causing adjustment of a size and shape of the plurality of the three-dimensional reference unit cell meshes to conform respectively to the plurality of three-dimensional tetrahedral elements in a manner forming a plurality of mapped three-dimensional unit cell meshes that define an infill geometry having a consistent topology at each interface location on the infill geometry where each of the plurality of mapped three-dimensional unit cell meshes are connectable to an outer skin mesh enclosing the infill geometry, and all the interface locations have respective interface geometries that are diffeomorphic to each other such that all of the mapped three-dimensional unit cell meshes transition smoothly into the outer skin mesh with a uniform geometry and shape, regardless of the physical location of the interface location on the body;
      stitching together the plurality of mapped three-dimensional unit cell meshes, including merging the cell mesh nodes that are coincident, in a manner forming a stitched mesh representing the infill geometry of the body and which has the interface locations that have respective interface geometries that are diffeomorphic to each other; and
      constructing a body digital representation of the infill geometry based on the stitched mesh.

2. The method of claim 1, further comprising causing the processor to perform the following in response to a second command:
   performing one or more smoothing operations on the stitched mesh, to result in a smoothed mesh.

3. The method of claim 1, further comprising generating the three-dimensional reference unit cell mesh by performing one of the following:
   constructing the three-dimensional reference unit cell mesh as one or more trimmed parametric surfaces, followed by meshing the one or more trimmed parametric surfaces, to thereby result in the three-dimensional reference unit cell mesh comprised of shell elements;
   constructing the three-dimensional reference unit cell mesh as a solid structure represented by one or more trimmed parametric surfaces enclosing a volume, followed by meshing the volume, to thereby result in the three-dimensional reference unit cell mesh composed of solid elements.

4. The method of claim 1, wherein mapping the plurality of the three-dimensional reference unit cell meshes to the three-dimensional driver mesh comprises one of the following:

using linear basis functions to map the plurality of the three-dimensional reference unit cell meshes respectively into the plurality of three-dimensional tetrahedral elements of the three-dimensional driver mesh;

using quadratic basis functions to map the plurality of the three-dimensional reference unit cell meshes respectively into the plurality of three-dimensional tetrahedral elements of the three-dimensional driver mesh.

5. The method of claim 1, further comprising:
constructing the three-dimensional driver mesh by performing a three-dimensional Delaunay triangulation on a driver digital model of the body.

6. The method of claim 1, wherein accessing the three-dimensional driver mesh comprises:
accessing the three-dimensional driver mesh having a density that is spatially graded over at least one region of the body.

7. The method of claim 1, further comprising:
assigning a thickness to the outer skin mesh, represented either by the outermost triangular faces of the plurality of three-dimensional tetrahedral elements of the three-dimensional driver mesh, or by a meshed representation of trimmed parametric surfaces defining an outer skin;
extruding the outer skin mesh in a direction normal to the outer skin by an amount equal to the assigned thickness;
constructing the body digital representation to include the outer skin mesh and the stitched mesh representing the infill geometry;
developing an additive manufacturing software program based on the body digital representation of the outer skin mesh and the stitched mesh; and
additively manufacturing a physical version of the body including an outer skin and the infill geometry using an additive manufacturing apparatus.

8. A processor-based system configured to perform computer readable program instructions for generating an infill geometry of a three-dimensional body, comprising:
a user interface;
a memory device containing the computer readable program instructions and configured to store:
a driver mesh file, accessible through the user interface, and comprising a three-dimensional driver mesh representing a solid version of the body, and the three-dimensional driver mesh is comprised of a plurality of three-dimensional tetrahedral elements;
a unit cell geometry file, accessible through the user interface, and comprising a three-dimensional reference unit cell mesh configured to fit exactly within a three-dimensional regular tetrahedron having triangular faces, and the three-dimensional reference unit cell mesh is made up of a plurality of cell mesh elements and associated cell mesh nodes, and the three-dimensional reference unit cell mesh is symmetric with respect to the arrangement of the cell mesh nodes on the triangular faces; and
a processor configured to execute the computer readable program instructions in response to a command received through the user interface, and execution of the instructions causes the processor to perform functions comprising:
mapping the cell mesh nodes of a plurality of the three-dimensional reference unit cell meshes respectively into the plurality of three-dimensional tetrahedral elements of the three-dimensional driver mesh, through the use of basis functions defined on each of the plurality of three-dimensional tetrahedral elements, in a manner causing adjustment of a size and shape of the plurality of the three-dimensional reference unit cell meshes to conform respectively to the plurality of three-dimensional tetrahedral elements in a manner forming a plurality of mapped three-dimensional unit cell meshes that define an infill geometry having a consistent topology at each interface location on the infill geometry where each of the plurality of mapped three-dimensional unit cell meshes are connectable to an outer skin mesh enclosing the infill geometry, and all the interface locations have respective interface geometries that are diffeomorphic to each other such that all of the mapped three-dimensional unit cell meshes transition smoothly into the outer skin mesh with a uniform geometry and shape, regardless of the physical location of the interface location on the body;
stitching together the plurality of mapped three-dimensional unit cell meshes, including merging the cell mesh nodes that are coincident, in a manner forming a stitched mesh representing the infill geometry of the body and which has the interface locations that have respective interface geometries that are diffeomorphic to each other; and
constructing a body digital representation of the infill geometry based on the stitched mesh.

9. The processor-based system of claim 8, further comprising:
a mesh smoothing module configured to perform one or more smoothing operations on the stitched mesh, to result in a smoothed mesh.

10. The processor-based system of claim 8, wherein:
the processor is configured to map the cell mesh nodes of the plurality of three-dimensional reference unit cell meshes onto the three-dimensional driver mesh using one of linear basis functions or quadratic basis functions.

11. The processor-based system of claim 8, wherein:
the three-dimensional driver mesh is spatially graded over at least one region of the body.

12. The processor-based system of claim 9, wherein:
the processor is configured to perform a numerical analysis on the three-dimensional driver mesh representing the outer skin and the infill geometry, each defined by one of shell elements or solid elements; and
wherein the numerical analysis comprises determining the distribution of a physical quantity across the three-dimensional driver mesh in response to the application of a given combination of loads, constraints, and material properties of the body.

13. The processor-based system of claim 12, wherein:
the numerical analysis is a finite element analysis.

14. The processor-based system of claim 12, wherein:
the processor is configured to refine the three-dimensional driver mesh into a refined three-dimensional driver mesh having a density that is spatially graded in correspondence with the distribution of a scalar quantity across the refined three-dimensional driver mesh; and
the processor is configured to map the plurality of the three-dimensional reference unit cell meshes respectively into a plurality of three-dimensional tetrahedral elements of the refined three-dimensional driver mesh through the use of the basis functions, to thereby result in a refined infill geometry of the three-dimensional body.

15. The processor-based system of claim 11, wherein:
the processor is configured to construct the three-dimensional reference unit cell mesh as one or more trimmed parametric surfaces, followed by meshing the one or more trimmed parametric surfaces, to thereby result in the three-dimensional reference unit cell mesh comprised of shell elements.

16. The processor-based system of claim 11, wherein:
the processor is configured to construct the three-dimensional reference unit cell mesh as a solid structure represented by one or more trimmed parametric surfaces enclosing a volume, followed by meshing the volume, to thereby result in the three-dimensional reference unit cell mesh composed of solid elements.

17. The processor-based system of claim 11, wherein:
the processor is configured to construct the three-dimensional driver mesh by performing a three-dimensional Delaunay triangulation on a driver digital model of the body.

18. The processor-based system of claim 11, wherein the processor is configured to:
assign a thickness to the outer skin mesh;
extrude the outer skin mesh in a direction normal to the outer skin by an amount equal to the assigned thickness; and
construct the body digital representation to include the outer skin mesh and the stitched mesh representing the infill geometry.

19. The processor-based system of claim 18, wherein:
the outer skin mesh is represented either by the outermost triangular faces of the plurality of three-dimensional tetrahedral elements of the three-dimensional driver mesh, or by a meshed representation of trimmed parametric surfaces defining an outer skin.

20. The processor-based system of claim 18, wherein the processor is configured to:
develop the additive manufacturing software program based on the body digital representation of the outer skin mesh and the stitched mesh.

\* \* \* \* \*